United States Patent
Iryo et al.

[11] Patent Number: 5,789,476
[45] Date of Patent: Aug. 4, 1998

[54] FILM-FORMING COATING SOLUTION AND SYNTHETIC RESIN LENS

[75] Inventors: Takeaki Iryo; Satoshi Kubota; Kazunori Miyashita; Katsuyoshi Takeshita, all of Suwa; Hirokazu Tanaka, Kitakyushu; Shuitsu Hiraoka, Kitakyushu; Masafumi Hirai, Kitakyushu; Tatsuhisa Uchino, Kitakyushu, all of Japan

[73] Assignees: Seiko Epson Corporation; Catalysts & Chemicals Industries Co., Ltd., both of Tokyo, Japan

[21] Appl. No.: 545,494

[22] Filed: Oct. 19, 1995

[30] Foreign Application Priority Data

Mar. 3, 1995 [JP] Japan .................. 7-044682

[51] Int. Cl.$^6$ .................................................... C08K 3/18
[52] U.S. Cl. .................. 524/430; 524/431; 106/286.4; 106/287.14; 106/287.16; 106/287.19; 106/287.34
[58] Field of Search ................ 106/286.4, 287.14, 106/287.16, 287.19, 287.34; 524/430, 431

[56] References Cited

U.S. PATENT DOCUMENTS

| | | | |
|---|---|---|---|
| 3,428,595 | 2/1969 | Tsukada et al. | 524/430 |
| 3,455,732 | 7/1969 | Hathaway, Jr. | 524/430 |
| 4,479,824 | 10/1984 | Schutt | 106/287.16 |
| 4,775,733 | 10/1988 | Kanemura et al. | |
| 5,015,523 | 5/1991 | Kawashima et al. | |
| 5,021,091 | 6/1991 | Takarada et al. | 106/287.14 |
| 5,223,030 | 6/1993 | Valette et al. | 106/287.14 |
| 5,449,712 | 9/1995 | Gierke et al. | 106/287.16 |

FOREIGN PATENT DOCUMENTS

| | | | |
|---|---|---|---|
| 0378895 | 7/1990 | European Pat. Off. | |
| 545347 | 6/1993 | European Pat. Off. | C03C 17/25 |
| 3335557 | 8/1984 | Germany | G02B 1/10 |
| 3425923 | 2/1985 | Germany | G02B 1/10 |
| 19511627 | 10/1995 | Germany | C09D 183/06 |
| 59-133211 | 7/1984 | Japan. | |
| 61-54331 | 11/1986 | Japan. | |
| 63-37142 | 7/1988 | Japan. | |
| 1301517 | 12/1989 | Japan. | |
| 2264902 | 10/1990 | Japan. | |
| 368901 | 3/1991 | Japan. | |
| 52102 | 1/1993 | Japan. | |

OTHER PUBLICATIONS

European Search Report, Jun. 28, 1996, 2 pages.

*Primary Examiner*—Melvyn I. Marquis
*Attorney, Agent, or Firm*—Webb Ziesenheim Bruening Logsdon Orkin & Hanson, P.C.

[57] ABSTRACT

Disclosed is a film-forming coating solution comprising a matrix and a fine particulate compound oxide composed of oxides of titanium, silicon and zirconium and/or aluminum. This film-forming coating solution can form a colorless and transparent film of high refractive index which is excellent in dyeing property and adhesion to the substrate. Also disclosed is a synthetic resin lens of high refractive index having a film (hard coat film) formed from the film-forming coating solution on the surface. This synthetic resin lens is free from interference fringe and has a reduced thickness.

19 Claims, No Drawings

FILM-FORMING COATING SOLUTION AND SYNTHETIC RESIN LENS

FIELD OF THE INVENTION

The present invention relates to a film-forming coating solution, and a substrate, in particular a synthetic resin lens, having a film formed from the coating solution. More specifically, the invention relates to a coating solution for forming, on a substrate, a film which is colorless and transparent, has a high refractive index and is excellent in hot water resistance, weathering resistance, light resistance, scuffing resistance, abrasion resistance, impact resistance, flexibility, dyeing properties and adhesion to a substrate made of glass or plastic. The invention also relates to a synthetic resin lens which has a hard coat film of a high refractive index formed from the coating solution on its surface and is free from interference fringe.

BACKGROUND OF THE INVENTION

Various processes have been heretofore proposed in order to form, on a substrate made of plastic or glass, a hard coat film having a refractive index higher than or almost equal to that of the substrate.

In this connection, a lens formed from a diethylene glycol bisallyl carbonate resin is excellent in safety, processability and fashionableness as compared with a glass lens, and has rapidly come into wide use recently with the development of anti-reflection technique, hard coat technique and their combined technique. However, the diethylene glycol bisallyl carbonate resin has a refractive index of 1.50, which is lower than that of a glass lens, and thus a near-sight lens formed from this resin has a drawback that such resin lens has a larger thickness in its periphery than the glass lens. In the field of synthetic resin lens for spectacles, therefore, it has been actively tried to develop techniques for thinning the lens by using resin materials of a high refractive index. For example, high-refractive index resin materials having a refractive index of 1.60 or more are proposed in Japanese Patent Laid-Open Publications No. 133211/1984, No. 46213/1988 and No. 270859/1990.

On the other hand, the plastic lens for spectacles is susceptible to scuffing, so that the surface of the plastic lens is generally provided with a silicon based hard coat film. However, if this method is applied to a high-refractive index resin lens having a refractive index of not less than 1.54, interference fringe is produced by a difference of the refractive index between the resin lens and the coat film, resulting in bad appearance. To solve this problem, Japanese Patent Publications No. 54331/1986 and No. 37142/1988 disclose a coating technique in which a colloidal dispersion of silicon dioxide fine particles used in the silicon based film-forming coating solution (film-forming coating solution being also referred to as "coating composition" hereinafter) is replaced with a colloidal dispersion of inorganic oxide fine particles, such as those of Al, Ti, Zr, Sn or Sb oxide, having a high refractive index. Further, Japanese Patent Laid-Open Publication No. 301517/1989 discloses a process for preparing a compound sol of titanium dioxide and cerium dioxide; Japanese Patent Laid-Open Publication No. 264902/1990 discloses compound inorganic oxide fine particles of Ti and Ce; and Japanese Patent Laid-Open Publication No. 68901/1991 discloses a technique for treating compound oxide fine particles of Ti, Ce and Si oxides with an organosilicon compound to use for a coating solution.

Moreover, Japanese Patent Laid-Open Publication No. 2102/1993 discloses a hard coat film containing compound oxide fine particles of Ti and Fe or compound oxide fine particles of Ti, Fe and Si.

For example, when a colloidal dispersion of Al, Zr, Sn or Sb oxide fine particles is used in the coating compositions described in Japanese Patent Publications No. 54331/1986 and No. 37142/1988 for a high-refractive index resin lens having a refractive index of not less than 1.54, the interference fringe on the resulting coating film after curing can be reduced to a certain extent as compared with that of the silicon based coating solution. However, if fine particles of inorganic oxide of Al or Sb are used, there is a limit on the increase in refractive index of the coating film, and thus it is impossible to perfectly inhibit the interference fringe on the lens substrate having a refractive index of not less than 1.60. The reason therefor is considered that although these inorganic oxide fine particles per se have a high refractive index of not less than 1.60, they are generally mixed with an organosilicon compound or an epoxy resin as a matrix of a coating composition, so that the amount of the particles is reduced by the amount of the matrix in the composition, and thus the refractive index of the coat film is lower than that of the lens substrate. Further, since the dispersibility of Zr or Sn inorganic oxide fine particles is unstable in the matrix, a transparent film cannot be obtained with a large amount of the particles. On the other hand, use of a colloidal dispersion of Ti inorganic oxide fine particles in a coating composition not only can provide the resulting film with a refractive index of about 1.60 or more because $TiO_2$ itself has a higher refractive index than the aforementioned inorganic oxides, but also makes it possible to define an intended refractive index of the film within a wide range. However, the film formed from a coating composition containing $TiO_2$ has a disadvantage that $TiO_2$ is extremely low in the weathering resistance, so that $TiO_2$ induces decomposition of organic components in the composition such as the organosilicon compound or the epoxy resin and thus deterioration of the film on the surface of the resin substrate, resulting in reduced film durability. A further disadvantage of this film is poor adhesion to the substrate.

In the coating composition containing compound oxide fine particles of titanium dioxide and cerium dioxide described in Japanese Patent Laid-Open Publications No. 264902/1990 and No. 68901/1991, or in the coating composition containing compound oxide fine particles of titanium dioxide and iron oxide described in Japanese Patent Laid-Open Publication No. 2102/1993, titanium dioxide is used for improving its weathering resistance, in the form of a compound oxide with cerium dioxide or iron oxide, but the films obtained from these coating compositions are still insufficient in the weathering resistance. Additionally, cured films obtained from the coating compositions containing a compound sol of these oxides are more or less colored.

In recent years, as the refractive index of a plastic lens has been increased, it has become possible to make the thickness of the lens smaller. Therefore, the plastic lens having such a high refractive index is treated by a multi-coating method to provide thereon a hard coat film, and further an anti-reflection film. Because the multi-coating method produces distortion of the plastic lens substrate, the lens is easily broken when dropped. To prevent such defects, a soft primer layer for absorbing shock is provided between the plastic lens and the hard coat film. In this case, however, interference fringes take place if the refractive index of the primer layer is different from that of the substrate, so that it is desired to form a primer layer having a refractive index equal to that of the substrate.

OBJECT OF THE INVENTION

The present invention is intended to solve the problems associated with the prior art as described above, and it is an object of the invention to provide a coating solution capable of forming a film which is colorless and transparent, has high refractive index and is excellent in hot water resistance, weathering resistance, light resistance, scuffing resistance, abrasion resistance, impact resistance, flexibility, dyeing properties and adhesion to a substrate.

It is another object of the invention to provide a coating solution capable of forming a hard coat film which is colorless, transparent, excellent in durability and free from interference fringe, on a resin lens having a refractive index of not less than 1.54. It is a further object of the invention to provide a thin synthetic resin lens having such a hard coat film on its surface.

SUMMARY OF THE INVENTION

According to one aspect, the present invention provides a film-forming coating solution comprising a fine particulate compound oxide and a matrix, the fine particulate compound oxide comprising oxides of (i) titanium, (ii) silicon and (iii) zirconium and/or aluminum.

As the fine particulate compound oxide, preferably used are (A) a colloidal fine particulate compound oxide composed of a core and a cover thereon, the core comprising titanium oxide, and the cover comprising silicon oxide and zirconium oxide, or (A') a colloidal fine particulate compound oxide composed of a core and a cover thereon, the core comprising a fine particulate compound oxide of titanium and silicon, or of titanium, silicon and zirconium, and the cover comprising at least one oxide selected from silicon oxide, zirconium oxide and aluminum oxide.

Viewed from a further aspect, the present invention provides a synthetic resin lens comprising a resin lens substrate having a refractive index of not less than 1.54 and a film of high refractive index provided on the surface of the substrate, said film being formed from a coating solution comprising a fine particulate compound oxide and a matrix, wherein the fine particulate compound oxide is (A) a fine particulate compound oxide comprising oxides of (i) titanium, (ii) silicon and (iii) zirconium; and the matrix is (B) at least one compound selected from organosilicon compounds represented by the following formula:

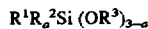
$R^1R_a^2Si(OR^3)_{3-a}$ wherein $R^1$ is a hydrocarbon group of 1 to 6 carbon atoms, a vinyl group, or an organic group having a methacryloxy group, a mercapto group, an amino group or an epoxy group, $R^2$ is a hydrocarbon group of 1 to 4 carbon atoms, $R^3$ is a hydrocarbon group of 1 to 8 carbon atoms, an alkoxyalkyl group or an acyl group, and a is 0 or 1, hydrolyzates thereof and partial condensates of the hydrolyzates; and wherein the coating solution further comprises at least one component selected from (C) at least one compound selected from organosilicon compounds represented by the following formula:

$Si(OR^4)_4$ wherein $R^4$ is a hydrocarbon group of 1 to 8 carbon atoms, an alkoxyalkyl group or an acyl group, hydrolyzates thereof and partial condensates of the hydrolyzates;

(D) a fine particulate oxide of at least one element selected from Si, Al, Sn, Sb, Ta, Ce, La, Fe, Zn, W, Zr and In, and/or a fine particulate compound oxide comprising oxides of at least two elements selected from Si, Al, Sn, Sb, Ta, Ce, La, Fe, Zn, W, Zr, In and Ti, with the proviso that a fine particulate compound oxide comprising oxides of Zr, Ti and Si is excluded;

(E) at least one compound selected from polyfunctional epoxy compounds, polyhydric alcohols and phenols, polycarboxylic acids and anhydrides thereof;

(F) at least one compound selected from hindered amine compounds; and (G) at least one compound selected from amines, amino acids, metallic acetylacetonates, organic acid metallic salts, perchloric acid, salts of perchloric acid, acids and metallic chlorides.

DETAILED DESCRIPTION OF THE INVENTION

High-Refractive Index Film-Forming Coating Solution

First, the high-refractive index film-forming coating solution according to the invention is described.

The high-refractive index film-forming coating solution of the invention comprises a matrix and a fine particulate compound oxide.

Fine Particulate Compound Oxide

As the fine particulate compound oxide in the coating solution, a fine particulate compound oxide comprising oxides of (i) titanium, (b) silicon and (iii) zirconium and/or aluminum is used.

That is, the compound oxide used according to the invention is any one of compound oxides comprising:

(1) oxides of Ti, Si and Zr, (2) oxides of Ti, Si, Zr and Al, and (3) oxides of Ti, Si and Al.

The fine particulate compound oxide may be hydrated or hydroxylated at least in part.

The compound oxide used in the invention preferably has a mean particle diameter of 1 to 800 nm, more preferably 2 to 300 nm. When the mean particle diameter exceeds 800 nm, the resulting film tends to be whitened and become opaque, whereas when the mean particle diameter is less than 1 nm, the resulting film shows an insufficient hardness and thus poor scuffing resistance and abrasion resistance, and also the refractive index of the film cannot be increased sufficiently.

The fine particulate compound oxide used in the invention comprises oxides of (i) titanium, (ii) silicon and (iii) zirconium and/or aluminum, preferably in a particle structure composed of a core and a cover thereon, the core comprising fine particulate titanium oxide, and the cover comprising silicon oxide and zirconium oxide (referred to as "component (A)" or "fine particulate compound oxide (A)" hereinafter), or a compound oxide composed of a core and a cover, the core comprising a fine particulate compound oxide comprising titanium and silicon oxides, or a fine particulate compound oxide comprising titanium, silicon and zirconium oxides, and the cover comprising at least one oxide selected from silicon oxide, zirconium oxide and aluminum oxides (referred to as "fine particulate compound oxide (A')" hereinafter).

The component (A) is described below in detail.

As described above, the component (A) is a fine particulate compound oxide composed of a core comprising fine particulate titanium oxide and a cover thereon comprising silicon oxide and zirconium oxide. The compound oxide fine particles of this structure are preferred because stable weathering resistance can be assured.

The refractive index of the titanium oxide is in the range of 2.2 to 2.7 depending on its crystalline structure, which is higher than that of oxide of Al, Zr, Sn or Sb. However, a film which is obtained by coating and curing a coating solution, which contains a colloidal dispersion of titanium oxide and a silicon coupling agent, is poor in the weathering resistance, so that deterioration of the film takes place because of lowering of adhesion between the film and the substrate or decomposition of the vehicle ingredient in the film. The reason why the unfavorable phenomenon takes place is presumably that titanium oxide absorbs ultraviolet light of 230 to 320 nm to be activated. The combined use of titanium oxide and zirconium oxide in the compound oxide can inhibit this activation of titanium oxide, and improve the weathering resistance of the titanium oxide much more than a compound oxide of titanium oxide and cerium oxide. Furthermore, since zirconium oxide is less colored as compared with cerium oxide, the fine particulate compound oxide of titanium and zirconium can provide a more colorless film. In order to improve weathering resistance of the titanium oxide, a weight ratio of zirconium oxide to titanium oxide ($ZrO_2/TiO_2$) is preferably not less than 0.05. If the amount of zirconium oxide is too large, the refractive index of the film is lowered, so that the weight ratio of $ZrO_2/TiO_2$ is preferably not more than 10.0.

By further combining these two fine particulate oxides with fine particulate, silicon oxide, the resulting film can be enhanced in hardness and adhesion to the anti-reflection layer. The amount of silicon oxide used is preferably in the range of 5 to 80% by weight based on the total amount of the inorganic oxides. When the amount of silicon oxide is less than 5% by weight, satisfactory effect is not exerted. When the amount thereof is more than 80% by weight, the refractive index is considerably lowered.

The fine particulate compound oxide (A') is described below in detail.

The fine particulate compound oxide (A') is composed of a core comprising a fine particulate compound oxide of titanium and silicon oxides, or titanium, silicon and zirconium oxides, and a cover thereon comprising at least one oxide selected from silicon oxide, zirconium oxide and aluminum oxide.

The fine particulate compound oxide (A') preferably has the following structure:

(1) a particulate core of a compound oxide comprising titanium and silicon, or titanium, silicon and zirconium, in which silicon atom, or silicon atom and zirconium atom are uniformly dispersed in the crystal lattice of titanium oxide in the form of a solid solution, and (2) a cover on the particulate core comprising at least one oxide selected from silicon oxide, zirconium oxide and aluminum oxide in a single-layer or multi-layer structure.

In the fine particulate compound oxide (A'), titanium, silicon, zirconium and aluminum are preferably contained, in terms of $TiO_2$, $SiO_2$, $ZrO_2$ and $Al_2O_3$, in such amounts that a weight ratio $SiO_2/TiO_2$ is 0.073 to 1.133, a weight ratio $ZrO_2/TiO_2$ is 0 to 0.400, and a weight ratio $Al_2O_3/TiO_2$ is 0 to 0.0133, respectively.

When the fine particulate compound oxide (A') comprises oxides of titanium, silicon and zirconium, a weight ratio $SiO_2/TiO_2$ is 0.073 to 1.133, preferably 0.09 to 0.400, and a weight ratio $ZrO_2/TiO_2$ is 0.001 to 0.400, preferably 0.002 to 0.320. When the fine particulate compound oxide (A') comprises oxides of titanium, silicon, zirconium and aluminum, a weight ratio $SiO_2/TiO_2$ is 0.073 to 1.133, preferably 0.09 to 0.400, a weight ratio $ZrO_2/TiO_2$ is 0.001 to 0.400, preferably 0.002 to 0.320, and a weight ratio $Al_2O_3/TiO_2$ is 0.0005 to 0.0133, preferably 0.001 to 0.010. When the fine particulate compound oxide (A') comprises oxides of titanium, silicon and aluminum, a weight ratio $SiO_2/TiO_2$ is 0.073 to 1.133, preferably 0.09 to 0.400, and a weight ratio $Al_2O_3/TiO_2$ is 0.0005 to 0.0133, preferably 0.001 to 0.010.

From a coating solution containing the fine particulate compound oxide (A') having $SiO_2/TiO_2$ of less than 0.073, $ZrO_2/TiO_2$ of less than 0.001, or $Al_2O_3/TiO_2$ of less than 0.0005, a film of high weathering resistance cannot be formed on the substrate according to circumstances. On the other hand, when $SiO_2/TiO_2$ is more than 1.133, $ZrO_2/TiO_2$ is more than 0.400, or $Al_2O_3/TiO_2$ is more than 0.0133, the refractive index of the fine particulate compound oxide (A') becomes low. In order to obtain a film of high refractive index from a coating solution containing such fine particulate compound oxide (A') of low refractive index, a large amount of the fine particulate compound oxide (A') has to be used, and this is economically disadvantageous in the production of a substrate with a film of high-refractive index.

In the fine particulate compound oxide core, titanium, silicon and zirconium are preferably contained, in terms of $TiO_2$, $SiO_2$ and $ZrO_2$, in such amounts that a weight ratio $SiO_2/TiO_2$ is 0.053 to 0.429 and a weight ratio $ZrO_2/TiO_2$ is 0.001 to 0.300, respectively.

The fine particulate compound oxides described above, including (A) and (A'), are preferably surface treated with an organosilicon compound or an amine compound. By this surface treatment, the dispersed state of the fine particulate compound oxide can be stabilized for a long period of time in the coating solution containing the compound oxide and the matrix, even when an ultraviolet curing resin is used as the matrix. Furthermore, the fine particulate compound oxide surface modified with an organosilicon compound or an amine compound has improved reactivity with and affinity for the matrix, so that a film formed from a coating solution containing the surface-treated fine particulate compound oxide is superior in hardness, transparency and scuffing resistance to a film formed from a coating solution containing a fine particulate compound oxide without the surface treatment. Additionally, the surface-treated fine particulate compound oxide has much more improved affinity for a solvent used in the coating solution, as compared with compound oxide without the surface treatment.

For modifying the surface of the fine particulate compound oxide, any organosilicon compound known as a silane coupling agent is employable, and it may be properly selected depending, for example, on the type of a matrix or a solvent used in the coating solution of the invention.

Examples of the organosilicon compounds used herein include monofunctional silanes represented by the formula $R_3SiX$ (R is an alkyl group, a phenyl group, a vinyl group, or an organic group having methacryloxy group, a mercapto group, an amino group or an epoxy group, and X is a hydrolyzable group), e.g., trimethylsilane, dimethylphenylsilane and dimethylvinylsilane; difunctional silanes represented by the formula $R_2SiX_2$, e.g., dimethylsilane and diphenylsilane; trifunctinal silanes represented by the formula $RSiX_3$, e.g., methylsilane and phenylsilane; and tetrafunctional silanes represented by the formula $SiX_4$, e.g., tetraalkoxysilane such as tetraethoxysilane. In the surface treatment, the silane compounds may be used before or after the hydrolyzable groups are hydrolyzed. After the treatment, the hydrolyzable groups are preferably in the state of being reacted with —OH groups of the fine particles, but a part of them may remain in the unreacted state.

Examples of the amine compounds include quaternary ammonium compounds; alkylamines, such as ethylamine, triethylamine, isopropylamine and n-propylamine; aralkylamines, such as benzylamine; alicyclic amines, such as piperidine; and alkanolamines, such as monoethanol amine and triethanol amine.

The modification of the surface of the fine particulate compound oxide with the organosilicon compound or the amine compound can be carried out as follows: the fine particulate compound oxide is added to, for example, an alcohol solution of the organosilicon compound or the amine compound, then a given amount of water and if necessary a catalyst are added, and the resulting mixture is allowed to stand at room temperature or heated for a given period of time.

The surface modification can also be carried out by adding the hydrolyzate of the above compound and the fine particulate compound oxide to a mixture of water and alcohol, and then heating the resulting mixture.

The amount of the organosilicon compound or the amine compound may be properly determined depending on the amount of the hydroxyl groups present on the surface of the fine particulate compound oxide.

Matrix

As the matrix in the coating solution of the invention, conventional coating resins, such as acrylic resins, melamine resins, ultraviolet curing resins, urethane resins and phosphagene resins, are employable.

Also employable as the matrix is at least one compound selected from organosilicon compounds represented by the following formula:

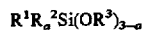

wherein $R^1$ is a hydrocarbon group of 1 to 6 carbon atoms, a vinyl group, or an organic group having a methacryloxy group, a mercapto group, an amino group or an epoxy group, $R^2$ is a hydrocarbon group of 1 to 4 carbon atom, $R^3$ is a hydrocarbon group of 1 to 8 carbon atoms, an alkoxyalkyl group or an acyl group, and a is 0 or 1, hydrolyzates thereof and partial condensates of the hydrolyzates (referred to as "component (B)" hereinafter).

When the component (A) is used as the fine particulate compound oxide in the coating solution of the invention, the component (B) is preferably used as the matrix.

Examples of the organosilicon compounds represented by the above formula include methyltrimethoxysilane, ethyltriethoxysilane, methyltriethoxysilane, methyltriacetoxysilane, phenyltriethoxysilane, dimethyldimethoxysilane, phenylmethyldimethoxysilane, vinyltrimethoxysilane, vinyltriethoxysilane, vinyltris(β-methoxyethoxy)silane, γ-glycidoxypropyltrimethoxysilane, γ-glycidoxypropyltriethoxysilane, γ-glycidoxypropylmethyldimethoxysilane, γ-glycidoxypropylmethyldiethoxysilane, β-(3,4-epoxycyclohexyl)ethyltrimethoxysilane, γ-methacryloxypropyltrimethoxysilane, N-β(aminoethyl)-γ-aminopropyltrimethoxysilane, N-β(aminoethyl)-γ-aminopropylmethyldimethoxysilane, γ-aminopropyltriethoxysilane, N-phenyl-γ-aminopropyltrimethoxysilane and γ-mercaptopropyltrimethoxysilane. These organosilicon compounds may be used singly or in combination.

The organosilicon compounds are preferably used without a solvent, or after hydrolyzed in a polar organic solvent such as alcohol in the presence of an acid. The hydrolysis may be carried out before or after the organosilicon compound is mixed with the fine particulate compound oxide. The amount of the film-forming component derived from the organosilicon compound as the component (B) in the cured film is preferably in the range of 10 to 90% by weight. If the amount thereof is less than 10% by weight, the adhesion between the substrate and the film may be lowered. The amount thereof more than 90% by weight may decrease the adhesion between the cured film and an anti-reflection layer made of an inorganic material when such an anti-reflection layer is provided on the cured film.

Other Components

When the component (A) is used as the fine particulate compound oxide and the component (B) is used as the matrix in the coating solution of the invention, the coating solution may further contain at least one component selected from the following components (C) to (G). In the coating solution of the invention containing the fine particulate compound oxide (A'), the same component(s) as above may also be added.

Component (C)

The component (C) is at least one compound selected from organosilicon compounds represented by the following formula:

wherein $R^4$ is a hydrocarbon group of 1 to 8 carbon atoms, an alkoxyalkyl group or an acyl group, hydrolyzates thereof and partial condensates of the hydrolyzates.

The component (C) is used for the purpose of easily adjusting the refractive index of the resulting film with keeping the transparency of the film and for the purpose of accelerating a curing rate of the coating film. By the use of the component (C), the refractive index of the cured film can be readily adjusted to match the refractive index of the lens substrate, and good adhesion between the cured film and the anti-reflection layer can be attained even in a decreased amount of the fine particulate compound oxide. Moreover, the tetrafunctional organosilicon compound as the component (C) can accelerate the curing rate of the coating film and inhibit discoloration of a dyed lens substrate, which tends to occur especially when a coating film is formed on a substrate made of a sulfur-containing urethane resin, resulting in a minimum change in color tone of the dyed lens after the film formation.

Examples of the tetrafunctional organosilicon compounds include tetramethoxysilane, tetraethoxysilane, tetrapropoxysilane, tetraisopropoxysilane, tetrabutoxysilane, tetraphenoxysilane, tetraacetoxysilane, tetraallyloxysilane, tetrakis(2-methoxyethoxy)silane, tetrakis(2-ethylbutoxy)silane and tetrakis(2-ethylhexyloxy) silane. These organosilicon compounds may be used singly or in combination. The organosilicon compounds are preferably used without a solvent, or after hydrolyzed in an organic solvent such as alcohol in the presence of an acid. The amount of the film-forming component derived from the tetrafunctional organosilicon compound as the component (C) in the cured film is preferably in the range of 0 to 50% by weight. If the amount thereof is more than 50% by weight, the film after cured may be easily cracked.

Component (D)

The component (D) is a fine particulate oxide of at least one element selected from Si, Al, Sn, Sb, Ta, Ce, La, Fe, Zn, W, Zr and In, and/or a fine particulate compound oxide comprising at least two elements selected from Si, Al, Sn, Sb, Ta, Ce, La, Fe, Zn, W, Zr, In and Ti, with the proviso that a fine particulate compound oxide comprising oxides of Zr, Ti and Si is excluded. The component (D) is used for the purpose of optimizing a refractive index of the resulting film, adhesion to the substrate, dyeing property of the film, heat resistance of the film, etc. depending on the type of the lens substrate. The component (D) is preferably used in the form of a colloidal dispersion of fine particles of inorganic oxides, in the combination as defined above, in water or an organic solvent. Specifically, the inorganic oxides are $SiO_2$, $Al_2O_3$, $SnO_2$, $Sb_2O_5$, $Ta_2O_5$, $CeO2$, $La_2O_3$, $Fe_2O_3$, $ZnO$, $WO_3$, $ZrO_2$ and $In_2O_3$. In any case, the particle diameter is preferably in the range of about 1 to 30 nm. The kind of the component (D) used in the coating solution of the invention and the amount thereof can be determined depending on the aimed film performance.

For improving dispersion stability of the fine particles in the coating solution, it is possible to use fine particles having been treated with an organosilicon compound or an amine compound in the same manner as described above.

Component (E)

The component (E) is at least one compound selected from polyfunctional epoxy compounds, polyhydric alcohols and phenols, polycarboxylic acids and anhydrides thereof, and is used for the purpose of enhancing dyeing property of the resulting film or improving durability of the film.

Examples of the polyfunctional epoxy compounds include diglycidyl ethers of dihydric alcohols and phenols, for example, alkylene glycols such as (poly)ethylene glycol, propylene glycol, polypropylene glycol or neopentyl glycol, catecohol and resorcinol; and di- or triglycidyl ethers of trihydric alcohols such as glycerol and trimethylolpropane.

Examples of the polyhydric alcohols and phenols include dihydric alcohols and phenols, for example, alkylene glycols such as (poly)ethyelne glycol, propylene glycol, polypropyelne glycol or neopentyl glycol, catecohol and resorcinol; trihydric alcohols such as glycerol and trimethylolpropane; and further polyvinyl alcohol.

Examples of polycarboxylic acids include malonic acid, succinic acid, adipic acid, azelaic acid, maleic acid, orthphthalic acid, terephthalic acid, fuscuffingic acid, itaconic acid and oxalacetic acid.

Examples of the anhydrides of the polycarboxylic acids include succinic anhydride, maleic anhydride, itaconic anhydride, 1,2-dimethylmaleic anhydride and phthalic anhydride.

The amount of the film-forming component derived from the component (E) in the cured film is preferably in the range of 0 to 40% by weight. When the amount thereof is more than 40% by weight, the adhesion of the cured film to an anti-reflection layer made of an inorganic material, which is formed on the cured film, may be lowered.

Component (F)

The component (F), at least one hindered amine compound, is used for the purpose of improving dyeing property of the coating film. Examples of the hindered amine compounds include bis(2,2,6,6-tetramethyl-4-piperidyl) sebacate, 1-{2-[3-(3,5-di-t-butyl-4-hydroxyphenyl) propionyloxy]ethyl}-4-[3-(3,5-di-t-butyl-4-hydroxyphenyl) propionyloxy)- 2,2,6,6-tetramethylpiperidine, 8-benzyl-7,7,9,9-tetramethyl-3-octyl-1,3,8-triazaspiro[4,5]undecane-2,4-dione, 4-benzoyloxy-2,2,6,6-tetramethylpipridine, 8-acetyl-3-dodecyl-7,7,9,9-tetramethyl-1,3,8-triazaspiro[4,5] undecane-2,4-dione, dimethyl succinate/1-(2-hydroxyethyl)-4-hydroxy-2,2,6,6-tetramethylpiperidine polycondensate, poly{[6-(1,1,3,3-tetramethylbutyl)amino-1,3,5-triazine-2,4-diyl][2,2,6,6-tetramethyl-4-piperidyl)imino]hexamethylene [(2,2,6,6-tetramethyl-4-piperidyl)imino]}, N,N'-bis(3-aminopropyl)ethylenediamine/2,4-bis[N-butyl-(1,2,2,6,6-pentamethyl-4-piperidyl)amino]-6-chloro-1,3,5-triazine condensate and 2-(3,5-di-t-butyl-4-hydroxybenzyl)-2-n-butylmalonic acid bis(1,2,2,6,6-pentamethyl-4-piperidyl).

The upper limit of the amount of the component (F) is desirably 3% by weight based on the total solid content in the coating solution. When the amount thereof is more than 3% by weight, the cured film may be lowered in the hardness and the resistance to hot water.

Component (G)

The component (G) is at least one compound selected from amines, amino acids, metallic acetylacetonates, organic acid metallic salts, perchloric acid, salts of perchloric acid, acids and metallic chlorides. The component (G) is used as a curing catalyst to accelerate curing of silanol or epoxy groups and thus accelerate the film-forming reaction. Particular examples of the curing catalysts include amines, such as n-butylamine, triethylamine, guanidine and biguanidine; amino acids, such as glycine; metallic acetylacetonates, such as aluminum acetylacetonate, chromium acetylacetonate, titanyl acetylacetonate and cobalt acetylacetonate; organic acid metallic salts, such as sodium acetate, zinc naphthenate, cobalt naphthenate, zinc octylate and tin octylate; perchloric acid, perchlorates, such as ammonium perchlorate and magnesium perchlorate; acids, such as hydrochloric acid, phosphoric acid, nitric acid and paratoluenesulfonic acid; and metallic chlorides or Lewis acids, such as $SnCl_2$, $AlCl_3$, $FeCl_3$, $TiCl_4$, $ZnCl_2$ and $SbCl_3$.

In the use of the curing catalyst, the type and the amount thereof can be determined depending on the composition of the coating solution, etc.

The upper limit of the amount of the component (G) used is desirably 5% by weight based on the total solid content in the coating solution. When the amount thereof is more than 5% by weight, the cured film may be lowered in hardness and resistance to hot water.

The coating solution of the invention may further contain, if desired, various additives such as surfactants, antistatic agents, ultraviolet light absorbers, antioxidants, disperse dyes, oil-soluble dyes, fluorescent dyes, pigments, photochromic compounds and thixotropic agents, in small amounts, to improve coating property of the coating solution and performance of the film formed therefrom.

Organic Solvent

An organic solvent may be used in the coating solution of the invention to adjust the solid concentration in the coating solution or control surface tension, viscosity and evaporation rate of the coating solution.

Examples of the organic solvents which may be used in the invention include alcohols, such as methanol, ethanol and isopropyl alcohol; cellosolves, such as methyl cellosolve and ethyl cellosolve; glycols, such as ethylene glycol; esters, such as methyl acetate and ethyl acetate; ethers, such as diethyl ether and tetrahydrofuran; ketones, such as acetone and methyl ethyl ketone; halogenated hydrocarbons, such as dichloroethane; aromatic hydrocarbons, such as toluene and xylene; carboxylic acids; and N,N-dimethylformamide. These solvents may be used singly or in combination.

Process for Preparing Film-Forming Coating Solution

The coating solution of the invention can be prepared by any conventional process using the fine particulate compound oxide and the matrix, and optionally other components, as described above. It is preferred that a sol in which the colloidal fine particulate compound oxide is dispersed in water and/or an organic solvent is first prepared and then the resulting sol is used to prepare the coating solution.

There is no specific limitation on the process for preparing the compound oxide sol. A process for preparing a sol in which the fine particulate compound oxide (A) is dispersed in water and/or an organic solvent may include, for example, a step of dissolving a zirconium compound and a silicon compound in a dispersion of colloidal titanium oxide.

A sol in which the fine particulate compound oxide (A') is dispersed in water and/or an organic solvent can be prepared by, for example, a process comprising the steps of:

(a) adding hydrogen peroxide to a gel or a sol of hydrated titanic acid to dissolve the hydrated titanic acid, and heating the resulting titanic acid aqueous solution in the presence of a silicon compound or in the presence of a silicon compound and a zirconium compound to yield a sol in which a fine particulate compound oxide of colloidal titanium oxide and silicon oxide, or colloidal titanium oxide, silicon oxide and zirconium oxide is dispersed, and (b) mixing the sol with at least one compound selected from silicon compounds, zirconium compounds and aluminum compounds, followed by heating the resulting mixture with keeping the mixture alkaline.

The steps (a) and (b) are described below in detail.

Step (a)

First, a sol or a gel of hydrated titanic acid is prepared in a manner conventionally known. By the term "hydrated titanic acid" used herein is meant to include titanium oxide hydrate and titanium hydroxide.

Then, to the sol or gel of hydrated titanic acid or to a mixture thereof, an aqueous hydrogen peroxide is added to dissolve the hydrated titanic acid, to prepare a homogeneous aqueous solution. In this procedure, it is preferred that the system is heated at a temperature of not lower than about 50° C. and/or stirred, if necessary. If the concentration of the hydrated titanic acid in the aqueous solution is too high, dissolving of the hydrated titanic acid needs a long period of time, or the undissolved gel is precipitated, or the resulting aqueous solution becomes too viscous. Therefore, the $TiO_2$ concentration in the aqueous solution is preferably not more than about 10% by weight, more preferably not more than about 5% by weight.

In the preparation of the aqueous solution, if the amount of the hydrogen peroxide added is in such an amount that $H_2O_2/TiO_2$ (by weight) is not less than 1, the hydrated titanic acid can be perfectly dissolved into aqueous solution. The $H_2O_2/TiO_2$ (by weight) is preferably 2 to 6.

The aqueous solution of hydrated titanic acid (titanic acid aqueous solution) prepared above is then mixed with a silicon compound or a zirconium compound. Examples of the silicon compounds used herein include silica gel, silica sol, silicic acid solutions and alkali metal silicates. Examples of the zirconium compounds include inorganic salts, organic salts, oxides, hydroxides and alkoxide. These silicon compounds and zirconium compounds may be used singly or in combination, respectively.

Subsequently, the resulting mixture is heated to a temperature of preferably not lower than 80° C. If the heating temperature is higher than the boiling point of the dispersion medium, the heating may be carried out in an autoclave. As a result, there can be obtained a sol in which a fine particulate compound oxide core of titanium and silicon, or titanium, silicon and zirconium is dispersed.

Step (b)

The step (b) is described below in detail.

To the sol of fine particulate compound oxide core obtained as above, a silicon compound and a zirconium compound and/or an aluminum compound are added in prescribed amounts, and they are mixed. Examples of the silicon compounds used herein include silica gel, silica sol, silicic acid solutions and alkali metal silicates. The zirconium compound and the aluminum compound are preferably selected from inorganic salts, organic salts, oxides, hydroxides and alkoxides, respectively. These compounds are preferably used in the form of an aqueous solution or slurry. For example, as for the zirconium compound, it is preferred to use an aqueous solution of hydrated zirconium oxide, which can be prepared by hydrolyzing a zirconium salt to obtain hydrated zirconium oxide and then adding hydrogen peroxide to the hydrated zirconium oxide.

The mixture containing the sol of the compound oxide core and the silicon compound or the like is heated to preferably not lower than 80° C. with keeping the mixture alkaline. As a result, there can be obtained a sol in which the fine particulate compound oxide core covered with silicon and zirconium and/or aluminum oxides is dispersed.

Alternatively, the mixture containing the sol of the fine particulate compound oxide core and the silicon compound is heated to preferably not lower than 80° C. with keeping the mixture alkaline, to prepare a sol in which the fine particulate compound oxide covered with silicon oxide is dispersed. To the sol, a zirconium compound and/or an aluminum compound is then added, and the resulting mixture is heated to preferably not lower than 80° C. As a result, there can be obtained a fine particulate compound oxide composed of the fine particulate core obtained by the step (a) and a two-layer cover, wherein the core is covered with silicon oxide, which in turn is further covered with zirconium oxide, aluminum oxide or both oxides.

The coating solution of the invention can be obtained by mixing the fine particulate compound oxide with the matrix and if necessary other components.

In the use of the compound oxide sol as prepared above in the preparation of the coating solution of the invention, the compound oxide sol may be concentrated, or it may be subjected to solvent displacement to form an organosol. Further, the mixture obtained after the solvent replacement may be concentrated.

In the preparation of the coating solution, the compound oxide sol may be directly dispersed in an organic solvent for the coating solution, or it may be dispersed after the solvent displacement with an organic solvent is performed.

The fine particulate compound oxide is contained in the coating solution of the invention in such amounts that when titanium, silicon, zirconium and aluminum contained in the compound oxide are converted to $TiO_2$, $SiO_2$, $ZrO_2$ and $Al_2O_3$, respectively, the total weight of $TiO_2$, $SiO_2$, $ZrO_2$ and $Al_2O_3$ is 5 to 500 parts by weight, preferably 10 to 300 parts by weight, based on 100 parts by weight of the matrix.

In the preparation of the coating solution of the invention, the above-mentioned compound oxide sol is preferably used, but a powder of fine particulate compound oxide may be also used as far as the compound oxide can be monodispersed in the coating solution.

Substrate With Film

The substrate with a film according to the invention is described below.

The coating solution of the invention can be applied to various substrates to form a film or a hard coat film having a high refractive index.

The substrate for a hard coat film having a high refractive index includes various ones such as glass substrate and plastic substrate. Specifically, there can be mentioned various optical lenses such as spectacle lenses and camera lenses, various display element filters, looking glasses, window glasses, coating films for automobiles, light covers for automobiles. The substrate for forming thereon a film of high refractive index other than the hard coat film includes a primer film for plastic lens.

The thickness of the film formed on the substrate surface is preferably in the range of 0.05 to 30 μm, though it varies depending on the purpose of the substrate with a film.

The substrate with a film according to the invention can be prepared in the following manner. The surface of the substrate as mentioned above is coated with the coating solution of the invention by means of, for example, dip coating, spin coating, spray coating or flow coating, and the solution is dried to form a film which is then heated at a temperature lower than the thermal resistance temperature of the substrate. In the case of the lens substrate having a heat distortion temperature of lower than 100° C., spin coating is preferably used because the lens substrate does not need to be fixed by a fixing tool. When the substrate is a resin lens, the film is desirably formed by coating the substrate with the coating solution and then heating it to dryness at a temperature of 40° to 200° C. for several hours.

When an ultraviolet curing resin is used as a matrix component of the coating solution, the substrate with a film according to the invention can be prepared by coating the substrate with the coating solution and then irradiating it with a ultraviolet light to cure the film.

In the preparation of the substrate with a film according to the invention, the surface of the substrate may be beforehand treated with an alkali, an acid or a surfactant, or abraded with inorganic or organic fine particles, or subjected to primer treatment or plasma treatment, so as to improve the adhesion between the lens substrate and the film.

Synthetic Resin Lens

The synthetic resin lens according to the invention is described below in detail.

The synthetic resin lens of the invention is a typical example of the substrate with a film, and comprises a resin lens substrate having a refractive index of not less than 1.54 and a film of high refractive index provided on the substrate, said film being formed from the coating solution containing the component (A) as the fine particulate compound oxide, the component (B) as the matrix, and further at least one component selected from the components (C) to (G), as described above (referred to as "coating composition of the invention" hereinafter).

It is an object of the invention to provide a thin synthetic resin lens of good appearance and high durability, and this object can be attained by using the coating solution of the invention. For obtaining a synthetic resin lens of high refractive index, various patent applications have been made and laid open. It is a further object of the invention to provide a thin synthetic resin lens for spectacle having a film formed from the coating solution of the invention. For such thin lens, the lens substrate preferably has a refractive index of not less than 1.54, and further, various properties are required, such as transparency, dyeing property, heat resistance, water absorption property, flexural strength, impact strength, weathering resistance and processability. Therefore, the lens substrate is preferably made of, for example, sulfur-containing urethane resins or (meth)acrylic resins.

Further, by providing a single-layer or multi-layer anti-reflection film made of an inorganic material on the cured film, light reflection can be reduced or light transmission can be improved, whereby the function as the spectacle lens can be much more enhanced. The anti-reflection film can be formed using inorganic materials, such as SiO, $SiO_2$, $Si_3N_4$, $TiO_2$, $ZrO_2$, $Al_2O_3$, $MgF_2$ and $Ta_2O_5$, by a thin film forming method such as vacuum deposition.

Preferred lens substrates are now described in more detail.

One of the preferred lens substrates is a sulfur-containing resin lens substrate, which can be prepared by injecting a mixture of a polyisocyanate compound and 4-mercaptomethyl-3,6-dithio-1,8-octadithiol represented by the following formula (1):

and/or pentaerythritol tetra(3-mercaptopropionate) represented by the following formula (2):

into a mold consisting of a glass form and a gasket, where the mixture is thermally polymerized.

Examples of the polyisocyanate compounds include tolylene diisocyanate, diphenylmethane diisocyanate, polymeric diphenylmethane diisocyanate, toluidine diisocyanate, naphthalene diisocyanate, hexamethylene diisocyanate, isophorone diisocyanate, xylylene diisocyanate, hydrogenated xylylene diisocyanate, hydrogenated diphenylmethane diisocyanate, tetramethyl xylylene diisocyanate, 2,5-bis(isocyanatemethyl)bicyclo[2,2,1]heptane, 2,6-bis(isocyanatemethyl)bicyclo[2,2,1]heptane, 3,8-bis(isocyanatemethyl)tricyclo[5,2,1,0$^{2,6}$]-decane, 3,9-bis(isocyanatemethyl)tricyclo[5,2,1,0$^{2,6}$]-decane, 4,8-bis(isocyanatemethyl)tricyclo[5,2,1,0$^{2,6}$]-decane, 4,9-bis(isocyanatemethyl)tricyclo[5,2,1,0$^{2,6}$]-decane and dimer acid diisocyanates. Also employable are allophanate modified products, biuret modified products and isocyanurate modified products of these polyisocyanate compounds. These polyisocyanate compounds may be used singly or in combination.

The polyisocyanate compound and the thiol compound may be used in such amounts that a molar ratio NCO/SH (functional group) is in the range of usually 0.5 to 3.0, preferably 0.5 to 1.5. Further, additives such as internal release agents, chain extending agents, crosslinking agents, light stabilizers, ultraviolet light absorbers, antioxidants, colorants such as disperse dyes and oil-soluble dyes, and reaction catalysts may be properly added to the material. On the sulfur-containing urethane resin lens substrate thus obtained, a cured film formed from the coating solution of the invention is provided, whereby a spectacle lens having good appearance, good film durability, high refractive index, high Abbe's number and excellent impact resistance can be obtained.

A further preferred lens substrate is a (meth)acrylic resin lens substrate which can be formed from a copolymer of a monomer represented by the following formula (3):

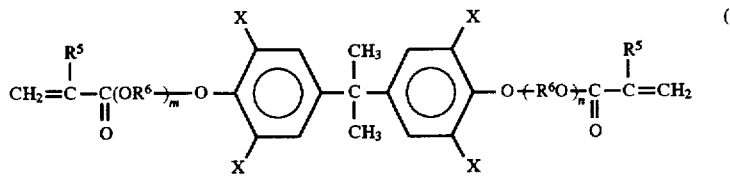

wherein $R^5$ is a hydrogen atom or a methyl group, $R^6$ is $CH_2CH_2$ or $CHCH(OH)CH_2$, X is a hydrogen atom or a halogen atom other than fluorine, and m and n are each an integer satisfying the condition of $0 \leq m+n \leq 8$; and other polymerizable monomer.

Examples of the (meth)acrylic monomers represented by the formula (3) include 2,2-bis(3,5-dibromo-4-(meth)acryloyloxyethoxyphenyl)propane, 2,2-bis(4-(meth)acryloyloxyethoxyphenyl)propane -and 2,2-bis[4-(β-hydroxy-γ-(meth)acryloyloxyethoxyphenyl)propoxyphenyl]-propane.

Examples of the other polymerizable monomers include aromatic monofunctional vinyl monomers, such as styrene, chlorostyrene, bromostyrene and α-methylstyrene; aromatic polyfunctional vinyl monomers, such as divinylbenzene and its chlorine- or bromine-substituted derivatives; monofunctional (meth)acrylate monomers, such as methyl (meth)acrylate, ethyl (meth)acrylate, 2-hydroxyethyl (meth)acrylate, glycidyl methacrylate, benzyl methacrylate, phenoxy methacrylate and cyclohexyl methacrylate; polyfunctional (meth)acrylic monomers, such as ethylene glycol di(meth)acrylate, diethylene glycol di(meth)acrylate, triethylene glycol di(meth)acrylate, tetraethylene glycol di(meth)acrylate, propylene glycol di(meth)acrylate, dipropylene glycol di(meth)acrylate, di(meth)acrylate of butanediol; thiol compounds, such as those represented by the formulae (1) and (2), and further pentaerythritol and tetra (mercaptoacetate). These monomers may be used singly or in combination.

In the molding process, preferably, a composition composed of 20 to 80% by weight of the (meth)acrylic monomer represented by the above formula (3) and 80 to 20% by weight of other polymerizable monomer is injected into a mold consisting of a glass form and a gasket, where the composition is thermally polymerized and/or photopolymerized. During this process, to the monomer composition may be added conventional thermal polymerization initiators such as organic peroxides and azo compounds and/or conventional photopolymerization initiators such as those derived from acetophenones, benzoins and benzophenones, and further, other additives, such as crosslinking agents, light stabilizers, ultraviolet light absorbs, antioxidants, and colorants such as disperse dyes, oil-soluble dyes and pigments. On the (meth)acrylic resin lens substrate thus obtained, a cured film formed from the coating solution of the invention is provided, whereby a spectacle lens having good appearance, good film durability, high refractive index and high flexural strength can be obtained.

A further preferred lens substrate is a resin lens substrate formed from a copolymer of a (meth)acrylic monomer and/or a vinyl monomer, both having a sulfur atom and an aromatic ring, and other polymerizable monomer. The (meth)acrylic monomers and the vinyl monomers having a sulfur atom and an aromatic ring are, for example, a compound represented by the following formula (4) or (5):

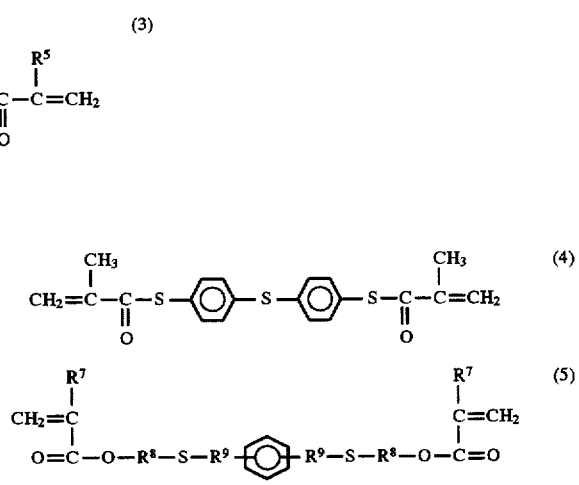

wherein $R^7$ is a hydrogen atom or a methyl group, and $R^8$ and $R^9$ are each an alkylene group of 1 to 9 carbon atoms.

Examples of the other polymerizable monomers are aromatic monofunctional vinyl monomers, aromatic polyfunctional vinyl monomers, monofunctional (meth)acrylate monomers, polyfunctional (meth)acrylic monomers and thiol compounds, and include those used for preparing the (meth)acrylic resin as described above. These monomers may be used singly or in combination.

In the molding process, preferably, a composition composed of 20 to 80% by weight of the (meth)acrylic monomer and/or vinyl monomer having a sulfur atom and an aromatic ring, and 80 to 20% by weight of other polymerizable monomer is injected into a mold consisting of a glass form and a gasket, where the composition is thermally polymerized and/or photopolymerized. During this process, to the monomer composition may be added conventional thermal polymerization initiators such as organic peroxides and azo compounds and/or conventional photopolymerization initiators such as those derived from acetophenones, benzoins and benzophenones, and further, other additives, such as crosslinking agents, light stabilizers, ultraviolet light absorbs, antioxidants, and colorants such as disperse dyes, oil-soluble dyes and pigments. On the resin lens substrate thus obtained, a cured film formed from the coating solution of the invention is provided, whereby a spectacle lens having good appearance, good film durability, high refractive index and high heat resistance can be obtained.

EFFECT OF THE INVENTION

According to the present invention, the refractive index of the film formed on a substrate can be freely controlled by varying the composition of the fine particulate compound oxide and the quantity ratio of the matrix to the compound oxide in the coating solution. Thus, the refractive index of the film can be made equal to that of the substrate as described above, to eliminate interference fringes caused by a difference of the refractive index between the substrate and the film. On the other hand, the refractive index of the film can also be made much higher than that of the substrate, to increase extremely the surface glossiness of the substrate. The film of such extremely high refractive index is excellent in the ultraviolet light shielding effect because the fine particulate compound oxide in the film contains titanium oxide as its major component. Accordingly, such film is favorably used as a coating film for automobiles or a topcoat film.

The film formed on the substrate using the film-forming coating solution of the invention is colorless, transparent and excellent in adhesion to the substrate, weathering resistance, light resistance, flexibility and dyeing property. Moreover, because of its high hardness, this film is excellent in scuffing resistance and abrasion resistance, and therefore is suitable for various optical lenses such as spectacle lenses and camera lenses, various display element filters and looking glasses. If a hard coat film of high refractive index is formed on the surface of the substrate such as a looking glass, window glass or display element filter, using the coating solution of the invention, prior to forming a colorless, transparent and multi-layer anti-reflection film of high surface hardness, an object can be clearly seen through the substrate with the hard coat film. If such an anti-reflection film as mentioned above is formed on a display element surface, an illuminant such as a fluorescent light is not reflected in the display element surface, so that the visualized image is made sharp and fatigue of eyes can be prevented.

The film of high refractive index formed on the substrate using the film-forming coating solution of the invention is colorless, transparent and excellent in weathering resistance, dyeing property and flexibility, and the refractive index of the film can be made equal to that of the substrate, so that the film can be favorably used as a primer film for plastic lens.

Further, by providing a cured film formed from the coating solution of the invention on a synthetic resin lens substrate having a refractive index of 1.54 or more, a lightweight and thin synthetic resin lens which is excellent in weathering resistance and durability and free from interference fringe and coloring of cured film can be obtained.

Furthermore, if an anti-reflection film made of an inorganic material is laminated on the cured film, surface reflection is inhibited and a function as spectacle lens can be much more improved.

EXAMPLE

The present invention will be further described with reference to the following examples, but it should be construed that the invention is in no way limited to those examples.

Example 1

(1) Preparation of Coating Solution

Into a flask equipped with a stirrer were introduced 41.15 g of ethyl cellosolve, 38.44 g of γ-glycidoxypropyltrimethoxysilane and 4.13 g of tetramethoxysilane in this order with stirring. Then, 12.90 g of 0.05N hydrochloric acid was added, and the mixture was stirred for 30 minutes. Subsequently, 0.04 g of a silicon surfactant (available from Nippon Unika K.K., trade name: L-7604) and 103.39 g of a sol of a fine particulate compound oxide dispersed in methyl cellosolve was further added, the mixture was thoroughly stirred and then allowed to stand at 0° C. for 24 hours for aging, to obtain a coating solution. The above sol contained a fine particulate compound oxide of titanium dioxide/zirconium dioxide/silicon dioxide in a weight ratio $TiO_2/ZrO_2/SiO_2$ of 68/17/15, the solid concentration of the sol was 20.5% by weight, and the compound oxide had such a particle structure that a core of a solid solution of $TiO_2$ and $ZrO_2$ was covered with $SiO_2$.

(2) Preparation of Plastic Lens Substrate

A mixture of 87 g of 4-mercaptomethyl-3,6-dithio-1,8-octanedithiol, 94 g of m-xylylene diisocyanate, 0.02 g of dibutyltin dilaurate, 0.15 g of an internal release agent and 0.09 g of 2-(5-methyl-2-hydroxyphenyl)benzotriazol was thoroughly stirred and then deaerated in vacuo (5 mmHg) for 60 minutes. Thereafter, the mixture was injected into a mold consisting of a glass form and a gasket, then kept at 40° C. for 7 hours and heated from 40° C. up to 120' C. over a period of 10 hours in a heating furnace to polymerize the monomers. After cooling, the glass form and the gasket were removed to obtain a sulfur-containing urethane resin lens.

The lens thus obtained had a refractive index of 1.66 and an Abbe's number of 33.

(3) Formation of Cured Film

The sulfur-containing urethane resin lens prepared above was immersed in a 5% by weight of sodium hydroxide aqueous solution for 5 minutes, then washed and dried. Thereafter, one surface of the lens was coated with the coating solution prepared in the procedure (1) by spin coating. In the spin coating, the coating solution (solution for forming a hard coat film) was applied to the lens surface at a low speed of revolution and the excessive coating solution was removed at 2,500 rpm for 1 second. After the resulting coating film was precured at 120° C. for 30 minutes and cooled, the other surface of the lens was also coated under the same conditions as above. The lens with the coating films was heated at 120° C. for 3 hours to cure the films. Each of the cured films had a thickness of 2.3 μm.

Separately, the sulfur-containing urethane resin lens obtained above was dyed with a commercially available dye for plastic lens (Umber D for Seiko Placks) in a dyeing bath at 90° C. for 3 minutes. The lens thus dyed was provided on both surfaces with the films as described above. The transmittance of the lens was measured using a spectrophotometer (MCPD-1000, manufactured by Otsuka Denshi K.K.) before and after the film formation to obtain a color difference. As a result, $\Delta E_{ab}$ was 0.5, and a conspicuous change in color tone was not visually observed.

(4) Formation of Anti-reflection Film

The lens having a cured film formed as above was exposed to argon gas plasma at an output of 200 W in vacuo for 30 seconds, and thereon a thin anti-reflection film was formed by vacuum deposition. The anti-reflection layer had a five-layer structure composed of $SiO_2$, $ZrO_2$, $SiO_2$, $ZrO_2$ and $SiO_2$ layers laminated in this order from the lens surface toward the outside. In the anti-reflection film thus formed, the optical thickness of the $SiO_2$ layer on the lens surface side was about $\lambda/4$, the total optical thickness of the $ZrO_2$ layer and the intermediate $SiO_2$ layer was about $\lambda/4$, the optical thickness of the $ZrO_2$ layer was about $\lambda/4$, and the optical thickness of the topmost $SiO_2$ layer was about $\lambda/4$ (design wavelength λ: 510 nm).

The synthetic resin lens obtained by the above process was evaluated by the following performance tests, and the results are set forth in Table 1.

(1) Appearance

The appearance was evaluated by visually observing color of the undyed lens (colorless lens).

(2) Transmittance

The undyed lens (colorless lens) was measured on the mean visible light transmittance by a spectrophotometer.

(3) Interference Fringe

A light of a fluorescent lamp was made to be reflected on the lens surface against a black background, and occurrence of a rainbow pattern caused by the light interference was visually observed to judge the interference fringe based on the following criteria.

AA: No rainbow pattern is observed.
BB: A rainbow pattern is slightly observed.
CC: A rainbow pattern is conspicuously observed.

(4) Scuffing Resistance

On the lens, steel wool of #0000 was moved back and forth ten times under a load of 1 kg/cm$^2$. Then, the condition of the film was observed.

AA: Scuffing is hardly observed.
BB: Scuffing is slightly observed.
CC: Scuffing is greatly observed.

(5) Adhesion

The lens was immersed in a hot water at 70° C. for 2 hours. Then, the cut was made on the surface of the lens laterally and longitudinally with a knife to give 11 parallel lines at intervals of 1 mm so as to form 100 cells on the lens surface. A cellophane tape was adhered to the lens surface with the cut cells and then separated. The number of the cells on which the film was not peeled and still remained were counted.

(6) Weathering Resistance

The lens was exposed to a xenon long life fadeometer (available from Suga Shikenki K.K.) for 150 hours. Then, the following tests were carried out.

(i) Appearance

The appearance was evaluated by visually observing color of the undyed lens (colorless lens).

(ii) Transmittance

The undyed lens (colorless lens) was measured on the mean visible light transmittance by a spectrophotometer.

(iii) Adhesion

The exposed surface of the lens was subjected to the same crosscut tape test as in the above-mentioned adhesion test (5).

Example 2

A coating solution was prepared in the same manner as in Example 1 except that the sol was replaced with 103.39 g of a sol of a fine particulate compound oxide dispersed in methyl cellosolve. This sol contained a fine particulate compound oxide of titanium dioxide/zirconium dioxide/silicon dioxide in a weight ratio $TiO_2/ZrO_2/SiO_2$ of 68/17/15, the solid concentration of the sol was 20.5% by weight, and the compound oxide had such a three-layer particle structure that a core of $TiO_2$ was covered with $ZrO_2$ and further covered with $SiO_2$.

On the same sulfur-containing urethane resin lens substrate as produced in Example 1, cured films were formed in the same manner as in Example 1 except that the coating solution prepared above was used. The cured films had each a thickness of 2.3 μm. On one film, an anti-reflection film was provided as in Example 1.

The synthetic resin lens obtained by the above process was evaluated by the same performance tests as in Example 1. The results are set forth in Table 1.

Example 3

A coating solution was prepared in the same manner as in Example 1 except that the sol was replaced with 103.39 g of a sol of a fine particulate compound oxide dispersed in methyl cellosolve. This sol contained fine particulate compound oxide of titanium dioxide/zirconium dioxide/silicon dioxide in a weight ratio $TiO_2/ZrO_2/SiO_2$ of 68/17/15, the solid concentration of the sol was 20.5% by weight, and the compound oxide had such a three-layer particle structure that a core of $TiO_2$ was covered with $ZrO_2$ and further covered with $SiO_2$ and had been surface-treated with methyltrimethoxysilane.

On the same sulfur-containing urethane resin lens substrate as produced in Example 1, cured films were formed in the same manner as in Example 1 except that the coating solution prepared above was used. The cured films had each a thickness of 2.2 μm. On one film, an anti-reflection film was provided as in Example 1.

The synthetic resin lens obtained by the above process was evaluated by the same performance tests as in Example 1. The results are set forth in Table 1.

After stored at room temperature for 2 weeks, precipitation of particles was observed very slightly in the coating solutions of Examples 1 and 2, but no precipitation was observed in the coating solution of Example 3.

Example 4

(1) Preparation of Coating Solution

Into a flask equipped with a stirrer were introduced 37.87 g of ethyl cellosolve, 34.01 g of γ-glycidoxypropyltrimethoxysilane and 21.90 g of tetraethoxysilane in this order with stirring. Then, 21.79 g of 0.05N hydrochloric acid was added, and the mixture was stirred for 30 minutes. Subsequently, 0.04 g of the same silicon surfactant as used in Example 1 and 84.44 g of a sol of a fine particulate compound oxide in methyl cellosolve was further added, the mixture was thoroughly stirred, and then, allowed to stand at 0° C. for 24 hours for aging, to obtain a coating solution. The above sol contained fine particulate compound oxide of titanium dioxide/zirconium dioxide/silicon dioxide in a weight ratio $TiO_2/ZrO_2/SiO_2$ of 68/16/16, the solid concentration of the sol was 20.5% by weight, and the compound oxide had such a three-layer particle structure that a core of $TiO_2$ was covered with $ZrO_2$ and further covered with $SiO_2$ and had been surface-treated with methyltrimethoxysilane.

(2) Preparation of Plastic Lens Substrate

A mixture of 130 g of pentaerythritol tetra(3-mercaptopropionate), 100 g of m-xylylene diisocyanate, 0.018 g of dibutyltin dichloride, 0.18 g of an internal release agent and 0.115 g of 2-(2'-hydroxy-5'-t-octylpheyl) benzotriazol was thoroughly stirred and deaerated in vacuo (5 mmHg) for 60 minutes. Then, the mixture was injected into a mold consisting of a glass form and a gasket and was polymerized under the same heating conditions as in Example 1. After cooling, the glass form and the gasket were removed to obtain a sulfur-containing urethane resin lens.

The lens thus obtained had a refractive index of 1.59 and an Abbe's number of 36.

(3) Formation of Cured Film

The sulfur-containing urethane resin lens prepared above was immersed in a 5% by weight of sodium hydroxide aqueous solution for 5 minutes, then washed and dried. Thereafter, cured films were formed on the resin lens in the same manner as in Example 1 except that the coating solution prepared in the procedure (1) was used. The cured films had each a thickness of 2.5 μm.

The transmittance of the lens having been dyed in the same manner as in Example 1 was measured using a spectrophotometer (MCPD-1000, manufactured by Otsuka Denshi K.K.) before and after the film formation, to obtain a color difference. As a result, $\Delta E_{ab}$ was 0.4, and a conspicuous change in color tone was not visually observed.

(4) Formation of Anti-reflection Film

On the lens having a cure film provided as above, an anti-reflection film was formed in the same manner as in Example 1.

The synthetic resin lens obtained by the above process was evaluated by the same performance tests as in Example 1. The results are set forth in Table 1.

Example 5

(1) Preparation of Coating Solution

Into a flask equipped with a stirrer were introduced 68.18 g of methyl cellosolve, 13.12 g of γ-glycidoxypropyltrimethoxysilane, 27.58 g of γ-glycidoxypropylmethyldiethoxysilane and 16.91 g of tetramethoxysilane in this order with stirring. Then, 18.02 g of 0.05N hydrochloric acid was added, and the mixture was stirred for 30 minutes. Subsequently, 50.05 g of a sol of a fine particulate compound oxide in methanol, 5.67 g of glycerol diglycidyl ether (available from Nagase Sangyo K.K., trade name: Denacohol EX-313), 0.04 g of a silicon surfactant (available from Nippon Unika K.K., trade name: L-7001) and 0.4713 g of magnesium perchlorate as a curing catalyst were added in this order and dissolved. The above sol contained a fine particulate compound oxide of titanium dioxide/zirconium dioxide/silicon dioxide in a weight ratio $TiO_2/ZrO_2/SiO_2$ of 64/16/20, the solid concentration of the sol was 30% by weight, and the compound oxide had such a particle structure that a core of a solid solution of $TiO_2$ and $ZrO_2$ is covered with $SiO_2$ and had been surface-treated with dimethoxydipheylsilane. Then, the mixture was allowed to stand at 0° C. for 24 hours for aging, to obtain a coating solution.

(2) Preparation of Plastic Lens Substrate

A mixture of 50 g of styrene, 48.5 g of 2,2-bis(3,5-dibromo-4-methacryloyloxyethoxyphenyl)propane, 2.8 g of diethylene glycol bisallyl carbonate, 1.5 g of diisopropyl peroxydicarbonate and 0.2 g of 2-(5-methyl-2-hydroxyphenyl)benzotriazol was thoroughly stirred and injected into a mold consisting of a glass form and a gasket. The system was heated at 30° C. for 4 hours, then heated from 30° C. up to 50° C. over a period of 10 hours, further heated from 50° C. up to 70° C. over a period of 2 hours, then heated at 70° C. for 1 hours and finally heated at 80° C. for 2 hours. After cooling, the glass form and the gasket were removed to obtain a methacrylic resin lens.

The lens thus obtained had a refractive index of 1.59 and an Abbe's number of 32.

(3) Formation of Cured Film

The methacrylic lens prepared above was subjected to plasma treatment in a plasma surface treatment apparatus (available from Shinku Kikai Kogyo K.K.) under the conditions of an air flow rate of 100 ml/min, an output power of 50 W, a vacuum degree of 0.2 Torr and a treating time of 30 seconds. Then, the lens was coated with the coating solution prepared in the procedure (1) by means of dip coating at a take up rate of 15 cm/sec. After the coating, the coating film was cured at 120° C. for 3 hours to form a cured film. The cured film had a thickness of 2.2 μm.

Separately, the lens was dyed with the same dye as used in Example 1. The total light transmittance of the dyed lens was 53%, and the lens showed good dyeing properties.

(4) Formation of Anti-reflection Film

On the lens having a cured film provided as above, an anti-reflection film was formed in the same manner as in Example 1.

The synthetic resin lens obtained by the above process was evaluated by the same performance tests as in Example 1. The results are set forth in Table 1.

Example 6

To a coating solution prepared in the same manner as in Example 5 was added 0.1 g of bis(2,2,6,6-tetramethyl-4-piperidyl)sebacate (trade name: Sanol LS-770, available from Sankyo Co., Ltd.) as a hindered amine compound, and the mixture was aged as in Example 5.

On a methacrylic resin lens substrate which was prepared and pretreated in the same manner as in Example 5, a cured film was formed in the same manner as in Example 5 except that the coating solution prepared above was used. The cured film had a thickness of 2.3 μm.

Separately, the lens was dyed with the same dye as used in Example 1. The total light transmittance of the dyed lens was 35%, and the lens showed better dyeing property than the lens of Example 5.

On the film of the lens substrate, an anti-reflection film was formed in the same manner as in Example 1.

The synthetic resin lens obtained by the above process was evaluated by the same performance tests as in Example 1. The results are set forth in Table 1.

Example 7

(1) Preparation of Coating Solution

Into a flask equipped with a stirrer were introduced 37.87 g of methyl cellosolve and 34.01 g of γ-glycidoxypropyltrimethoxysilane in this order with stirring. Then, 9.34 g of 0.05N hydrochloric acid was added, and the mixture was stirred for 30 minutes.

Subsequently, 0.04 g of the same silicon surfactant as used in Example 1, 84.44 g of a sol of a fine particulate compound oxide in methanol and 21.17 g of a dispersion of colloidal silica in methanol (solid concentration: 30% by weight, trade name: Oscal 1132, available from Catalysts & Chemicals Industries Co., Ltd.) were added in this order, and the mixture was thoroughly stirred. The above sol contained a fine particulate compound oxide of titanium dioxide/ zirconium dioxide/silicon dioxide in a weight ratio $TiO_2/ZrO_2/SiO_2$ of 68/16/16, the solid concentration of the sol was 20.5% by weight, and the compound oxide had such a four-layer particle structure that a core of $TiO_2$ is covered with $SiO_2$, $ZrO_2$ and $SiO_2$ in this order and had been surface-treated with methoxytrimethylsilane. Then, the mixture was allowed to stand at 0° C. for 24 hours for aging, to obtain a coating solution.

(2) Preparation of Plastic Lens Substrate 40 g of styrene was mixed with 60 g of p-bis(2-methacryloyloxyethylthio)xylylene represented by the formula

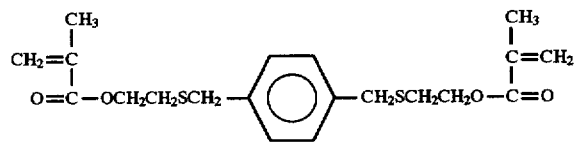

0.7 g of t-butylperoxy-2-ethylhexanoate and 0.2 g of 2-(5-methyl-2-hydroxyphenyl)benzotriazol, the mixture was thoroughly stirred and injected into a mold consisting of a glass form and a gasket. The system was heated at 50° C. for 8 hours, then heated from 50° C. up to 80° C. over a period of 5 hours, further heated from 80° C. up to 120° C. over a period of 4 hours and finally heated at 120° C. for 2 hours. After cooling, the glass form and the gasket were removed to obtain a methacrylic resin lens.

The lens thus obtained had a refractive index of 1.59 and an Abbe's number of 35.

(3) Formation of Cured Film

The methacrylic resin lens prepared above was immersed in a 5% by weight of sodium hydroxide aqueous solution for 5 minutes, then washed and dried. Thereafter, the lens was coated with the coating solution prepared in the procedure (1) by dip coating at a take up rate of 12 cm/sec. After the coating, the coating film was cured at 120° C. for 3 hours to form a cured film. The cured film had a thickness of 2.0 μm.

(4) Formation of Anti-reflection Film

On the lens having a cured film provided as above, an anti-reflection film was formed in the same manner as in Example 1.

The synthetic resin lens obtained by the above process was evaluated by the same performance tests as in Example 1. The results are set forth in Table 1.

Example 8

(1) Preparation of Coating Solution

Into a flask equipped with a stirrer were introduced 68.18 g of methyl cellosolve, 13.12 g of γ-glycidoxypropyltrimethoxysilane and 27.58 g of γ-glycidoxypropylmethyldiethoxysilane in this order with stirring. Then, 8.41 g of 0.05N hydrochloric acid was added, and the mixture was stirred for 30 minutes. Subsequently, 50.05 g of the same sol of fine particulate compound oxide of titanium dioxide/zirconium dioxide/silicon dioxide in methanol as used in Example 7; 21.98 g of the same dispersion of colloidal silica in methanol as used in Example 7; 5.67 g of glycerol diglycidyl ether (available from Nagase Sangyo K.K., trade name: Denacohol EX-313), 0.04 g of a silicon surfactant (available from Nippon Unika K.K., trade name: L-7001); 0.4713 g of magnesium perchlorate as a curing catalyst and 0.05 g of bis(1,2,2,6,6-pentamethyl-4-piperidyl)sebacate (trade name: Sanol LS-765, available from Sankyo Co., Ltd.) as a hindered amine compound were added in this order and dissolved. The mixture was allowed to stand at 0° C. for 24 hours for aging, to obtain a coating solution.

(2) Preparation of Plastic Lens Substrate 40 g of 4-mercaptomethyl-3,6-dithio-1,8-octanedithiol, 60 g of hydrogenation diphenylmethane diisocyanate, 0.1 g of dibutyltin dilaurate, 0.1 g of an internal release agent and 0.09 g of 2-(5-methyl-2-hydroxyphenyl)benzotriazol were mixed, the mixture was thoroughly stirred and deaerated in vacuo (5 mmHg) for 60 minutes. The mixture was injected into a mold consisting of a glass form and a gasket, then kept at 40° C. for 7 hours and heated from 40° C. up to 120° C. over a period of 10 hours in a heating furnace to polymerize the monomers. After cooling, the glass form and the gasket were removed to obtain a sulfur-containing urethane resin lens.

The lens thus obtained had a refractive index of 1.60 and an Abbe's number of 42.

(3) Formation of Cured Film

The sulfur-containing urethane resin lens prepared above was immersed in a 5% by weight of sodium hydroxide aqueous solution for 5 minutes, then washed and dried. Thereafter, the lens was coated with the coating solution prepared in the procedure (1) by dip coating at a take up rate of 12 cm/sec. After the coating, the coating film was cured at 120° C. for 3 hours to form a cured film. The cured film had a thickness of 2.5 μm.

Separately, the lens was dyed with the same dye as used in Example 1, and the total light transmittance of the dyed lens was 40%, and the lens showed good dyeing properties.

(4) Formation of Anti-reflection Film

On the lens having a cured film provided as above, an anti-reflection film was formed in the same manner as in Example 1.

The synthetic resin lens obtained by the above process was evaluated by the same performance tests as in Example 1. The results are set forth in Table 1.

Example 9

(1) Preparation of Coating Solution

Into a flask equipped with a stirrer were introduced 68.18 g of methyl cellosolve, 13.12 g of γ-glycidoxypropyltrimethoxysilane and 27.58 g of γ-glycidoxypropylmethyldiethoxysilane in this order with stirring. Then, 8.41 g of 0.05N hydrochloric acid was added, and the mixture was stirred for 30 minutes. Subsequently, 50.05 g of the same sol of fine particulate compound oxide of titanium dioxide/zirconium dioxide/silicon dioxide in methanol as used in Example 7; 22.38 g of a sol of a fine particulate compound oxide of tin oxide/tungsten oxide in methanol (solid concentration: 30% by weight, having been treated with triethylamine); 5.67 g of glycerol diglycidyl ether (available from Nagase Sangyo K.K., trade name: Denacohol EX-313); 0.04 g of a silicon surfactant (available from Nippon Unika K.K., trade name: L-7001); 0.4713 g of magnesium perchlorate as a curing catalyst and 0.05 g of bis(1,2,2,6,6-pentamethyl-4-piperidyl)sebacate (trade name: Sanol LS-765, available from Sankyo Co., Ltd.) as a hindered amine compound were added in this order and dissolved. Then, the mixture was allowed to stand at 0° C. for 24 hours for aging, to obtain a coating solution.

(2) Formation of Cured Film

The same sulfur-containing urethane resin lens as prepared in Example 1 was immersed in a 5% by weight of sodium hydroxide aqueous solution for 5 minutes, then washed and dried. Thereafter, the lens was coated with the coating solution prepared in the procedure (1) by dip coating at a take up rate of 12 cm/sec. After the coating, the coating film was cured at 120° C. for 3 hours to form a cured film. The cured film had a thickness of 2.6 μm.

Separately, the lens was dyed with the same dye as used in Example 1, and the total light transmittance of the dyed lens was 38%, and the lens showed good dyeing properties.

(3) Formation of Anti-reflection Film

On the lens having a cured film provided as above, an anti-reflection film was formed in the same manner as in Example 1.

The synthetic resin lens obtained by the above process was evaluated by the same performance tests as in Example 1. The results are set forth in Table 1.

Comparative Example 1

(1) Preparation of Coating Solution

Into a flask equipped with a stirrer were introduced 41.15 g of ethyl cellosolve, 38.44 g of γ-glycidoxypropyltrimethoxysilane and 4.13 g of tetramethoxysilane in this order with stirring. Then, 12.90 g of 0.05N hydrochloric acid was added, and the mixture was stirred for 30 minutes. Subsequently, 0.04 g of the same silicon surfactant as used in Example 1 and 103.39 g of a sol of a fine particulate compound oxide in methyl cellosolve were added in this order, the mixture was thoroughly stirred, and then allowed to stand at 0° C. for 24 hours for aging, to obtain a coating solution. The above sol contained a fine particulate compound oxide of titanium dioxide/cerium dioxide/silicon dioxide in a weight ratio $TiO_2/CeO_2/SiO_2$ of 68/17/15, the solid concentration of the sol was 20.5% by weight, and the compound oxide had been treated with tetramethoxysilane.

(2) Formation of Cured Film

The same sulfur-containing urethane resin lens as prepared in Example 1 was immersed in a 5% by weight of sodium hydroxide aqueous solution for 5 minutes, then washed and dried. Thereafter, the lens was coated with the coating solution prepared in the procedure (1) by spin coating under the same conditions as in Example 1. After the coating, the coating film was cured under the same conditions as in Example 1 to form a cured film. The cured films had each a thickness of 2.2 μm.

Separately, the sulfur-containing resin lens obtained above was dyed with a commercially available dye for plastic lens (Umber D for Seiko Placks) in a dyeing bath at 90° C. for 3 minutes. The lens thus dyed was provided with the same film as described above. The transmittance of the lens was measured using a spectrophotometer (MCPD-1000, manufactured by Otsuka Denshi K.K.) before and after the film formation, to obtain a color difference. As a result, $\Delta E_{ab}$ was 0.6, and a conspicuous change in color tone was not visually observed.

(3) Formation of Anti-reflection Film

On the lens having a cured film provided as above, a anti-reflection film was formed in the same manner as in Example 1.

The synthetic resin lens obtained by the above process was evaluated by the same performance tests as in Example 1. The results are set forth in Table 1.

Comparative Example 2

Into a flask equipped with a stirrer were introduced 54.63 g of ethyl cellosolve and 38.09 g of γ-glycidoxypropyltrimethoxysilane in this order with stirring. Then, 10.46 g of 0.05N hydrochloric acid was added, and the mixture was stirred for 30 minutes. Subsequently, 0.04 g of the same silicon surfactant as used in Example 1 and 96.83 g of a sol of antimony pentaoxide in methanol (available from Nissan Kagaku Kogyo K.K., solid concentration: 30% by weight) were added, the mixture was thoroughly stirred, and then allowed to stand at 0° C. for 24 hours for aging, to obtain a coating solution.

On the sulfur-containing urethane resin lens having a refractive index of 1.66 prepared in Example 1, a cured film was formed in the same manner as in Example 1 except that the coating solution prepared above was used. The cured films had each a thickness of 2.2 μm. On the film, an anti-reflection film was provided in the same manner as described above.

The synthetic resin lens obtained by the above process was evaluated by the same performance tests as in Example 1. The results are set forth in Table 1.

The transmittance of the lens having been dyed in the same manner as in Example 1 was measured before and after the film formation, to obtain a color difference. As a result, $\Delta E_{ab}$ was 2.0, and a change in color tone was visually observed.

Comparative Example 3

Into a flask equipped with a stirrer were introduced 69.21 g of ethyl cellosolve and 51.98 g of γ-glycidoxypropyltrimethoxysilane in this order with stirring. Then, 14.27 g of 0.05N hydrochloric acid was added, and the mixture was stirred for 30 minutes. Subsequently, 0.04 g of the same silicon surfactant as used in Example 1 and 64.54 g of a sol of a fine particulate compound oxide of titanium dioxide/cerium dioxide/silicon dioxide in methyl cellosove were added, the mixture was thoroughly stirred, and then allowed to stand at 0° C. for 24 hours for aging, to obtain a coating solution.

On the same sulfur-containing urethane resin lens having a refractive index of 1.59 prepared in Example 4, a cured film was formed in the same manner as in Example 1 except that the coating solution prepared above was used. The cured films had each a thickness of 2.3 μm. On the film, an anti-reflection film was provided in the same manner as in Example 1.

The synthetic resin lens obtained by the above process was evaluated by the same performance tests as in Example 1. The results are set forth in Table 1.

The transmittance of the lens having been dyed in the same manner as in Example 1 was measured before and after the film formation, to obtain a color difference. As a result, $\Delta E_{ab}$ was 2.1, and a change in color tone was visually observed.

Comparative Example 4

The synthetic sulfur-containing urethane resin lens of Example 1 but not provided with an anti-reflection film had a visible light transmittance of 88%.

C. for 96 hours in an autoclave. Then, the resulting colloidal solution was concentrated to obtain a sol in which a fine particulate titanium/silicon compound oxide core is dispersed and which had a solid concentration of 10% by weight (solution A).

(2) Preparation of Zirconium Compound Solution

To an aqueous solution of 263.2 g of zirconium oxychloride in 4,736.8 g of pure water containing 2% by weight of zirconium, in terms of $ZrO_2$, was added 15% aqueous

TABLE 1

|  | Appearance | Transmittance (%) | Interference Fringe | Scuffing Resistance | Adhesion | Weathering Resistance ||| 
|---|---|---|---|---|---|---|---|---|
|  |  |  |  |  |  | Appearance | Transmittance | Adhesion |
| Ex.1 | Colorless transparent | 98.5 | AA | AA | 100 | Colorless transparent | 97.0 | 100 |
| Ex.2 | Colorless transparent | 98.5 | AA | AA | 100 | Colorless transparent | 98.0 | 100 |
| Ex.3 | Colorless transparent | 98.5 | AA | AA | 100 | Colorless transparent | 98.0 | 100 |
| Ex.4 | Colorless transparent | 98.5 | AA | AA | 100 | Colorless transparent | 98.1 | 100 |
| Ex.5 | Colorless transparent | 98.5 | AA | AA | 100 | Colorless transparent | 97.2 | 100 |
| Ex.6 | Colorless transparent | 98.5 | AA | AA | 100 | Colorless transparent | 97.4 | 100 |
| Ex.7 | Colorless transparent | 98.5 | AA | AA | 100 | Colorless transparent | 98.1 | 100 |
| Ex.8 | Colorless transparent | 98.5 | AA | AA | 100 | Colorless transparent | 98.1 | 100 |
| Ex.9 | Colorless transparent | 98.5 | AA | AA | 100 | Colorless transparent | 98.0 | 100 |
| Comp Ex.1 | Slightly yellowed | 98.5 | AA | AA | 100 | Slightly yellowed | 95.2 | 100 |
| Comp Ex.2 | slightly yellowed | 98.5 | CC | AA | 100 | Yellowed | 93.1 | 100 |
| Comp Ex.3 | slightly yellowed | 98.5 | AA | AA | 100 | Slightly yellowed | 94.5 | 50 |

Example 10

(1) Preparation of Dispersion Sol of Fine Particulate Titanium/silicon Compound Oxide Core To an aqueous solution of titanium sulfate ($TiO_2$ concentration: 0.4% by weight) was slowly added 15% aqueous ammonia with stirring, to obtain a white slurry of pH 8.5. The slurry was filtered and washed to obtain a cake of hydrated titanic acid gel having a solid concentration of 9% by weight.

To 5.55 kg of the cake were added 6.06 kg of a 33% aqueous hydrogen peroxide and 13.4 kg of pure water. The mixture was heated at 80° C. for 5 hours to obtain 25 kg of a titanic acid aqueous solution ($TiO_2$ concentration: 2.0% by weight). The titanic acid aqueous solution was yellow brown and transparent, and had pH of 8.1.

Then, a mixture of 187.3 g of a silica sol having a mean particle diameter of 7 nm and a $SiO_2$ concentration of 15% by weight, 9 kg of the titanic acid aqueous solution as obtained above and 10.8 kg of pure water was heated at 200° ammonia to obtain a slurry of pH 8.5. The slurry was filtered and washed to obtain a cake having a $ZrO_2$ concentration of 10% by weight. To 61 g of the cake was added 154 g of pure water and further added a KOH aqueous solution to make the mixture alkaline. 90 g of aqueous hydrogen peroxide was added, and the mixture was heated to obtain 305 g of a solution of zirconium in aqueous hydrogen peroxide having a $ZrO_2$ concentration of 2% by weight (solution B).

(3) Preparation of Silicic Acid Solution

Commercially available water glass was diluted with pure water and dealkalized using a cation exchange resin, to prepare 945 g of a silicic acid solution having a $SiO_2$ concentration of 2% by weight.

(4) Preparation of Compound Oxide Sol 1 kg of the solution A was diluted with 4 kg of pure water to a solid concentration of 2% by weight, and the liquid was heated to 90° C. Then, 305 g of the solution B and 945 g of the silicic acid solution were added, and the resulting mixture was heated at 200° C. for 18 hours in an autoclave. Thereafter, the mixture was concentrated in a conventional manner to obtain an aqueous sol of fine particulate compound oxide of titanium oxide, silicon oxide and zirconium oxide. The aqueous sol was transparent or slightly semi-opaque and had a solid concentration of 20% by weight.

Then, the dispersion medium (water) of the sol was displaced with methanol, and the sol was concentrated to a solid concentration of 20% by weight, to obtain an organosol of compound oxide consisting of titanium oxide, silicon oxide and zirconium oxide (sol $A_1$). The organosol had a mean particle diameter of 10 nm, a weight ratio $ZrO_2/TiO_2$ of 0.0705 and a weight ratio $SiO_2/TiO_2$ of 0.3746.

Preparation of Hard Coat Film-forming Coating Solution

To a reaction vessel was introduced 276.1 parts by weight of γ-glycidoxypropyltrimethoxysilane, and thereto was slowly added 64.2 parts by weight of a 0.01N HCl aqueous solution with stirring, while the temperature of the vessel was kept at 10° C., to hydrolyze the γ-glycidoxypropyltrimethoxysilane. To the resulting solution were added 100.2 parts by weight of ethanol and 215 parts by weight of isopropanol to form a matrix.

To the matrix solution was added 1,173.4 parts by weight of the sol $A_1$ and was further added 10.03 parts by weight of aluminum acetylacetonate, followed by thoroughly stirring, to obtain a hard coat film-forming coating solution ($A_1$).

Example 11

Following to the procedure of Example 10 (4) except that 865 g of the solution B was used, an organosol of compound oxide consisting of titanium oxide, silicon oxide and zirconium oxide, which had a mean particle diameter of 11 nm, and a weight ratio $ZrO_2/TiO_2$ of 0.200, (sol $A_2$), was obtained.

Using the sol $A_2$, a hard coat film-forming coating solution ($A_2$) was prepared in the same manner as in Example 10.

Example 12

Following to the procedure of Example 10 (4) except that 3,175 g of the silicic acid solution was used, an organosol of compound oxide consisting of titanium oxide, silicon oxide and zirconium oxide, which had a mean particle diameter of 11 nm, and a weight ratio $SiO_2/TiO_2$ of 0.734, (sol $A_3$), was obtained.

Example 13

Following to the procedure of Example 10 (1) for obtaining the solution A except that the amount of the silica sol was varied, a sol of fine particulate titanium/silicon compound oxide core having a weight ratio $SiO_2/(TiO_2+SiO_2)$ of 8/100 was prepared. Then, this sol was mixed with the solution B and the silicic acid solution as prepared in Example 10, to prepare an organosol of compound oxide consisting of titanium oxide, silicon oxide and zirconium oxide, which had a mean particle diameter of 15 nm, a weight ratio $ZrO_2/TiO_2$ of 0.066 and a weight ratio $SiO_2/TiO_2$ of 0.292, (sol $A_4$), in the same manner as in Example 10 (4).

Using the sol $A_4$, a hard coat film-forming coating solution ($A_4$) was prepared in the same manner as in Example 10.

Example 14

Following to the procedure of Example 10 (1), to the mixture of the titanic acid aqueous solution, the silica sol and the pure water was further added 130 g of the solution B as a zirconium compound, to prepare a sol of fine particulate compound titanium/silicon/zirconium oxide core. Then, following to the procedure of Example 10 (4), from this sol, the solution B and the silicic acid solution, an organosol of compound oxide consisting of titanium oxide, silicon oxide and zirconium oxide, which had a mean particle diameter of 10 nm, a weight ratio $ZrO_2/TiO_2$ of 0.086 and a weight ratio $SiO_2/TiO_2$ of 0.377, (sol $A_1'$), was prepared.

Using the sol $A_1'$, a hard coat film-forming coating solution ($A_1'$) was prepared in the same manner as in Example 10.

Example 15

Following to the procedure of Example 10 (4) except that in addition to the solution A, the solution B and the silicic acid solution, 20 g of an aqueous solution of sodium aluminate ($Al_2O_3$ concentration: 0.3% by weight) was further used, a methanol sol of compound oxide consisting of titanium oxide, silicon oxide, zirconium oxide and aluminum oxide, which had a mean particle diameter of 10 nm, a weight ratio $ZrO_2/TiO_2$ of 0.0705, a weight ratio $SiO_2/TiO_2$ of 0.3746 and a weight ratio $Al_2O_3/TiO_2$ of 0.0007, (sol $B_1$), was prepared.

Using the sol $B_1$, a hard coat film-forming coating solution ($B_1$) was prepared in the same manner as in Example 10.

Example 16

In the same manner as in Example 15 except that the amount of the sodium aluminate was varied so that the weight ratio $Al_2O_3/TiO_2$ became 0.010, a sol of compound oxide consisting of titanium oxide, silicon oxide, zirconium oxide and aluminum oxide, which had a mean particle diameter of 11 nm, (sol $B_2$), was prepared.

Using the sol $B_2$, a hard coat film-forming coating solution ($B_2$) was prepared in the same manner as in Example 15.

Example 17

In the same manner as in Example 15 except that the solution B was not used, a methanol sol of compound oxide consisting of titanium oxide, silicon oxide and aluminum oxide, which had a mean particle diameter of 10 nm, a weight ratio $SiO_2/TiO_2$ of 0.3746 and a weight ratio $Al_2O_3/TiO_2$ of 0.0007, (sol $C_1$), was prepared.

Using the sol $C_1$, a hard coat film-forming coating solution ($C_1$) was prepared in the same manner as in Example 10.

Example 18

In the same manner as in Example 17 except that the weight ratio $SiO_2/TiO_2$ was varied to 0.3746 and the weight ratio $Al_2O_3/TiO_2$ was varied to 0.0100, a methanol sol of compound oxide consisting of titanium oxide, silicon oxide and aluminum oxide, which had a mean particle diameter of 10 nm, (sol $C_2$), was prepared.

Using the sol $C_2$, a hard coat film-forming coating solution ($C_2$) was prepared in the same manner as in Example 10.

Example 19

Into a reaction vessel was introduced 1,000 g of the sol $A_1$. To the vessel were then added 56 g of methyltrimethoxysilane and 20 g of pure water, and the mixture was heated at 50° C. for 18 hours. After the unreacted methyltrimethoxysilane was removed, the reaction mixture was concentrated to obtain a methanol sol of compound oxide consisting of titanium oxide, silicon oxide and zirconium oxide having been surface-treated with methyltrimethoxysilane, which had a solid concentration of 30.5% by weight, (sol $A_5$).

Using the sol, a hard coat film-forming coating solution ($A_5$) was prepared in the same manner as described above.

Example 20

In the same manner as in Example 19 except that the methyltrimethoxysilane was replaced with vinyltriethoxysilane, a methanol sol of compound oxide consisting of titanium oxide, silicon oxide and zirconium oxide having been surface-treated with vinyltriethoxysilane (sol $A_6$) was prepared.

Using the sol, a hard coat film-forming coating solution ($A_6$) was prepared in the same manner as described above.

Example 21

In the same manner as in Example 19 except that the sol $A_2$ was used in place of the sol $A_1$ and tetraethoxysilane was used in place of the methyltrimethoxysilane, a methanol sol of compound oxide consisting of titanium oxide, silicon oxide and zirconium oxide having been surface-treated with tetraethoxysilane, (sol $A_7$) was prepared.

Using the sol, a hard coat film-forming coating solution ($A_7$) was prepared in the same manner as described above.

Example 22

In the same manner as in Example 21 except that trimethylchlorosilane was used in place of the tetraethoxysilane, a methanol sol of compound oxide consisting of titanium oxide, silicon oxide and zirconium oxide having been surface-treated with trimethylchlorosilane (sol $A_8$) was prepared.

Using the sol, a hard coat film-forming coating solution ($A_8$) was prepared in the same manner as described above.

Example 23

In the same manner as in Example 21 except that γ-glycidoxypropyltriethoxysilane was used in place of the tetraethoxysilane, a methanol sol of compound oxide consisting of titanium oxide, silicon oxide and zirconium oxide having been surface-treated with γ-glycidoxypropyltriethoxysilane (sol $A_9$) was prepared.

Using the sol, a hard coat film-forming coating solution ($A_9$) was prepared in the same manner as described above.

Example 24

In the same manner as in Example 19 except that the sol $B_1$ was used in place of the sol $A_1$, a sol of compound oxide having been surface-treated with methyltrimethoxysilane (sol $B_3$) was prepared Using the sol, a hard coat film-forming coating solution ($B_3$) was prepared in the same manner as described above.

Example 25

In the same manner as preparation of hard coat film-forming coating solution in Example 10 except that 2,315 parts by weight of the sol $B_1$ was used in place of the sol $A_1$, a hard coat film-forming coating solution ($B'_1$) was prepared.

Example 26

Into a separable flask equipped with a stirrer and a condenser was introduced 2,000 g of the sol $A_1$. To the flask were added 89 g of tetraethoxysilane and 1,800 g of pure water. The mixture was reacted at 50° C. for 1 hour and cooled. Then, the reaction mixture was concentrated by ultrafiltration to the oxide concentration of 20% by weight, to obtain a methanol sol having a water content of 0.3% by weight.

To 100 g of the methanol sol was added 3.6 g of γ-methacryloxypropyltrimethoxysilane, and the mixture was reacted at 80° C. for 1 hour and cooled. Then, to the reaction mixture was added 20 g of 2-hydroxyethyl acrylate, followed by vacuum distillation at 40° C., to obtain a sol of compound oxide consisting of titanium oxide, silicon oxide and zirconium oxide, which had an oxide concentration of 46% by weight (sol D)

To 58.3 g of the sol D was added 20 g of an ultraviolet curing urethane resin (DH-700, available from Daihachi Kagaku K.K.) to obtain a hard coat film-forming coating solution (D).

Example 27

Preparation of Hard Coat Film

A polycarbonate molded article (Upiron U-4000, available from Mitsubishi Gas Kagaku K.K.) was immersed in a 13% NaOH aqueous solution at 47° C. for several minutes and then thoroughly washed with water.

The polycarbonate molded article thus treated was then immersed in each of the hard coat film-forming coating solutions $A_1$ to $A_9$, $A'_1$, $B_1$ to $B_3$, and $C_1$ to $C_2$ of Examples 10 to 24, then taken out at a rate of 80 mm/min, dried at 90° C. for 18 minutes, and heated at 104° C. for 90 minutes to cure the coating film, so as to form a hard coat film.

Properties of Hard Coat Film

The hard coat film thus formed was evaluated on the following properties. The results are set forth in Table 2.

(a) Refraction property

The reflection interference spectrum of the surface of the hard coat film was analyzed to obtain a refractive index of the film. The hard coat film having a refractive index of not less than 1.58 was ranked as AA.

(b) Scuffing resistance

On the hard coat film of the test piece having a size of 1 cm×3 cm, steel wool of #0000 was moved back and forth ten times under a load of 2 kg/cm² to rub the hard coat film with the steel wool. The degree of scuffing of the film was visually observed, and the film was evaluated based on the following criteria.

AA: The film is hardly scuffed.

BB: The film is slightly scuffed.

CC: The film is greatly scuffed.

(c) Appearance

The substrate with a hard coat film, which had high transparency and was hardly colored, was ranked as AA.

(d) Dyeing property

The substrate with a hard coat film was immersed in hot water containing three kinds of disperse dyes of red, blue and yellow at 92° C. for 5 minutes, and the extinction ratio at a wavelength of 550 nm was measured using a SM color computer (manufactured by Suga Shikenki K.K.). The hard coat film was evaluated based on the following criteria.

AA: The extinction ratio is not less than 30%.

BB: The extinction ratio is not less than 20% and less than 30%.

CC: The extinction ratio is less than 20%.

(e) Weathering resistance

The substrate with a hard coat film was subjected to an accelerated exposure test for 400 hours using a weatherometer (manufactured by Suga Shikenki K.K.), and a change in appearance was observed. The degree of change was evaluated by the three criteria, AA, BB and CC.

After the exposure test, total light transmittance and yellow index ($\Delta Y$) were measured.

(f) Antidim

The substrate with a hard coat film was placed between a black background and a three-wavelength type daylight fluorescent lamp, and the light pattern transmitted by the substrate and reflected on the background was visually observed. The antidim caused by the hard coat film was evaluated by the three criteria, AA, BB and CC.

(g) Long-term stability

Using the hard coat film-forming coating solution stored at 10° C. for 25 days or 45 days, a hard coat film was formed in the same manner as described above. The film was evaluated on the above-mentioned properties (a) to (d) and (f), and the results were compared with those of the hard coat film formed immediately after the preparation of the hard coat film-forming coating solution. The difference was evaluated by the three criteria, AA, BB and CC.

(h) Adhesion

The substrate with a hard coat film was immersed in a hot water at 70° C. for 2 hours. Then, the cut was made on the surface of the film surface laterally and longitudinally with a knife to give 11 parallel lines at intervals of 1 mm so as to form 100 cells on the film surface. A cellophane tape was adhered and then separated to observe whether the film was peeled off or not.

Example 28

Using the coating solution (B'$_1$) obtained in Example 25, a hard coat film was formed on the surface of a plastic lens (refractive index: 1.67, trade name: MR-7, available from Mitsui Toatsu Chemicals, Inc.) in the same manner as in Example 27. Then, the properties of the film were evaluated. The results are set forth in table 2.

The refractive index of the hard coat film (thickness: 2.4 μm), as obtained by analysis of the reflection interference fringe of the film surface, was 1.68.

Example 29

The polycarbonate molded article was subjected to the same treatment as in Example 27. The molded article thus treated was coated with the coating solution (D) obtained in Example 26 by spin coating (2,000 rpm) and then irradiated with a ultraviolet light of a high-pressure mercury lamp to cure the coating film, so as to form a hard coat film. The properties of the hard coat film was evaluated. The results are set forth in Table 2.

Example 30

To 1,000 g of the sol A$_9$ of Example 23 was added 800 g of methyl cellosolve, and the mixture was vacuum distilled in a rotary evaporator to obtain a methyl cellosolve sol of compound oxide consisting of titanium oxide, silicon oxide and zirconium oxide, which had an oxide concentration of 30% by weight, (sol A'$_9$).

Then, 500 g of the sol A'$_9$ was mixed with 500 g of an aqueous dispersion of an urethane elastomer (concentration: 30% by weight, trade name: Superflex 150, available from Dai-Ichi Kogyo Seiyaku Co., Ltd.) to prepare a high-refractive index primer coating solution.

Separately, a plastic lens (refractive index: 1.67, trade name: MR-7, available from Mitsui Toatsu Chemicals, Inc.) was immersed in a 13% NaOH aqueous solution at 47° C. for several minutes and then thoroughly washed with water.

Thereafter, the plastic lens was immersed in the primer coating solution prepared above, taken out at a rate of 95 mm/min, heated at 85° C. for 120 minutes and further heated at 104° C. for 60 minutes, to form a primer film on the lens surface.

On the primer film of the plastic lens, a hard coat film was formed in the same manner as in Example 27 using the hard coat film-forming coating solution (A$_1$).

Subsequently, the plastic lens with the high-refractive index primer film and the high-refractive index hard coat film was further provided with a multi-layer film by vacuum deposition as in Example 1 (4). Then, the properties of the hard coat film was evaluated in the same manner as in Example 27. The results are set forth in Table 2.

Further, the plastic lens with the above films was subjected to an impact resistance test. The impact resistance test was carried out by vertically dropping four kinds of steel balls (weight: 16.2 g, 100 g, 200 g, 400 g) on the lens, and the lens was evaluated by occurrence of cracking. The results are set forth in Table 3.

Comparative Example 5

In the same manner as in Example 10 except that the sol A$_1$ was replaced with a sol of compound oxide consisting of titanium oxide, iron oxide and silicon oxide (Optorake 1130F, available from Catalysts & Chemicals Ind. Co.), a hard coat film-forming coating solution (E$_1$) was prepared. Using the coating solution (E$_1$), a hard coat film was formed in the same manner as in Example 27, and then, the properties of the hard coat film were evaluated. The results are set forth in Table 2.

Comparative Example 6

In the same manner as in Example 10 except that the sol A$_1$ was replaced with a sol of compound oxide consisting of titanium oxide, cerium oxide and silicon oxide (Optorake 1130A, available from Catalysts & Chemicals Industries Co., Ltd.), a hard coat film-forming coating solution was prepared. Using this coating solution, a hard coat film was formed in the same manner as in Example 27, and then the properties of the hard coat film were evaluated. The results are set forth in Table 2.

Comparative Example 7

In the same manner as in example 27 except that the hard coat film-forming coating solution ($A_1$) prepared in Example 10 and a plastic lens (refractive index: 1.67, trade name: MR-7, available from Mitsui Toatsu Chemicals, Inc.) were used, a hard coat film was formed.

Subsequently, the plastic lens with the hard coat film was further provided with a multi-layer film by vacuum deposition as in Example 1 (4) and then subjected to the same impact resistance test as in Example 30. The results are set forth in Table 3.

TABLE 2

(I)

| Coating Solution | $A_1$ | $A_2$ | $A_3$ | $A_4$ | $A'_1$ | $B_1$ | $B_2$ | $C_1$ | $C_2$ |
|---|---|---|---|---|---|---|---|---|---|
| Refraction Property | AA | AA | AA | AA | AA | AA | AA | AA | AA |
| Scuffing Resistance | AA | AA | AA | AA | AA | AA | AA | AA | AA |
| Appearance | AA | AA | AA | AA | AA | AA | AA | AA | AA |
| Dyeing Property | AA | AA | AA | AA | AA | AA | AA | AA | AA |
| Weathering Property | | | | | | | | | |
| Change in appearance | AA | AA | AA | AA | AA | AA | AA | AA | AA |
| Total light transmittance (%) | 97.2 | 97.6 | 97.3 | 97.0 | 97.1 | 97.9 | 97.8 | 96.5 | 97.0 |
| Yellow index ($\Delta Y$) | 0.9 | 0.4 | 0.3 | 1.1 | 0.8 | 0.3 | 0.2 | 1.7 | 1.4 |
| Antidim | AA | AA | AA | AA | AA | AA | AA | AA | AA |
| Adhesion | AA | AA | AA | AA | AA | AA | AA | AA | AA |
| Stability | | | | | | | | | |
| After 25 days | AA | AA | AA | AA | AA | AA | AA | AA | AA |
| After 45 days | AA | AA | AA | AA | AA | AA | AA | AA | AA |

(II)

| Coating Solution | $A_5$ | $A_6$ | $A_7$ | $A_8$ | $A_9$ | $B_3$ | $B'_1$ | D | Ex.30 |
|---|---|---|---|---|---|---|---|---|---|
| Refraction Property | AA | AA | AA | AA | AA | AA | AA | AA | AA |
| Scuffing Resistance | AA | AA | AA | AA | AA | AA | AA | AA | AA |
| Appearance | AA | AA | AA | AA | AA | AA | AA | AA | AA |
| Dyeing Property | AA | AA | AA | AA | AA | AA | AA | AA | AA |
| Weathering Property | | | | | | | | | |
| Change in appearance | AA | AA | AA | AA | AA | AA | AA | AA | AA |
| Total light transmittance (%) | 97.5 | 97.6 | 98.0 | 97.6 | 97.6 | 97.9 | 97.5 | 97.3 | 97.1 |
| Yellow index ($\Delta Y$) | 0.5 | 0.4 | 0.3 | 0.4 | 0.4 | 0.3 | 0.5 | 0.4 | 0.7 |
| Antidim | AA | AA | AA | AA | AA | AA | AA | AA | AA |
| Adhesion | AA | AA | AA | AA | AA | AA | AA | AA | AA |
| Stability | | | | | | | | | |
| After 25 days | AA | AA | AA | AA | AA | AA | AA | AA | AA |
| After 45 days | AA | AA | AA | AA | AA | AA | AA | AA | AA |

(III)

| Coating Solution | Comp. Ex. 5 | Comp. Ex. 6 |
|---|---|---|
| Refraction Property | AA | AA |
| Scuffing Resistance | AA | AA |
| Appearance | BB | BB |
| Dyeing Property | AA | AA |
| Weathering Property | | |
| Change in appearance | CC | CC |
| Total light transmittance (%) | 94.7 | 94.4 |
| Yellow index ($\Delta Y$) | 3.2 | 3.5 |
| Antidim | AA | AA |
| Adhesion | AA | AA |
| Stability | | |
| After 25 days | AA | AA |
| After 45 days | AA | BB |

TABLE 3

|  | 16.2 g | 100 g | 200 g | 400 g |
|---|---|---|---|---|
| Ex. 29 | not cracked | not cracked | not cracked | not cracked |
| Comp. Ex. 7 | cracked | cracked | cracked | cracked |

What is claimed is:

1. A film-forming coating solution comprising a particulate compound oxide having a mean particle diameter of 1 to 800 nm, a resin matrix and an organic solvent, the particulate compound oxide comprising oxides of:
   (i) titanium,
   (ii) silicon, and
   (iii) zirconium or aluminum or both.

2. A film-forming coating solution as claimed in claim 1, wherein the particulate compound oxide is
   (A) a particulate compound oxide comprising oxides of (i) titanium, (ii) silicon and (iii) zirconium;
   and wherein the resin matrix is
   (B) at least one compound selected from organosilicon compounds, hydrolyzates thereof or partial condensates thereof, wherein the organosilicon compounds are represented by the following formula:

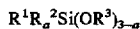
   $R^1R^2_aSi(OR^3)_{3-a}$ wherein $R^1$ is selected from the group consisting of a hydrocarbon group of 1 to 6 carbon atoms, a vinyl group, and an organic group having a substituent selected from the group consisting of a methacryloxy group, a mercapto group, an amino group and an epoxy group; $R^2$ is a hydrocarbon group of 1 to 4 carbon atoms; $R^3$ is selected from the group consisting of a hydrocarbon group of 1 to 8 carbon atoms, an alkoxyalkyl group and an acyl group; and a is 0 or 1; and
   wherein the coating solution further contains at least one component selected from the group consisting of:
   (C) at least one compound selected from organosilicon compounds, hydrolyzates thereof or partial condensates thereof, wherein the organosilicon compounds are represented by the following formula:

   $Si(OR^4)_4$ wherein $R^4$ is selected from the group consisting of a hydrocarbon group of 1 to 8 carbon atoms, an alkoxyalkyl group and an acyl group;
   (D) a particulate oxide of at least one element selected from the roup consisting of Si, Al, Sn, Sb, Ta, Ce, La, Fe, Zn, W, Zr and In, and/or a particulate compound oxide comprising oxides of at least two elements selected from the group consisting of Si, Al, Sn, Sb, Ta, Ce, La, Fe, Zn, W, Zr, In and Ti, wherein the particulate compound oxide of this part (D) excludes compound oxides of Zr, Ti and Si;
   (E) at least one compound selected from the group consisting of polyfunctional epoxy compounds, polyhydric alcohols and phenols, polycarboxylic acids and anhydrides thereof;
   (F) at least one compound selected from hindered amine compounds; and
   (G) at least one compound selected from the group consisting of amines, amino acids, metallic acetylacetonates, organic acid metallic salts, perchloric acid, salts of perchloric acid, acids and metallic chlorides.

3. The film-forming coating solution as claimed in claim 2, wherein the particulate compound oxide (A) is composed of a core and a cover thereon, the core comprising titanium oxide and the cover comprising zirconium oxide and silicon oxide.

4. The film-forming coating solution as claimed in claim 2, wherein the surfaces of the particles of the component (A) and/or the component (D) are reacted with an organosilicon compound or an amine compound.

5. The film-forming coating solution as claimed in claim 1, wherein the particulate compound oxide comprises a core and a cover thereon; wherein the core comprises a particulate compound oxide comprising oxides of titanium and silicon, or a particulate compound oxide comprising oxides of titanium, silicon and zirconium; and wherein the cover comprises at least one oxide selected from the group consisting of silicon oxide, zirconium oxide and aluminum oxide.

6. The film-forming coating solution as claimed in claim 5, wherein the particulate compound oxide in the core is in the form of a solid solution of silicon oxide and titanium oxide or silicon oxide, zirconium oxide and titanium oxide.

7. The film-forming coating solution as claimed in claim 5, wherein the oxides of titanium, silicon, zirconium and aluminum are $TiO_2$, $SiO_2$, $ZrO_2$ and $Al_2O_3$, respectively, and the weight ratio of $SiO_2/TiO_2$ is 0.073 to 1.133, the weight ratio of $ZrO_2/TiO_2$ is 0 to 0.400, and the weight ratio of $Al_2O_3/TiO_2$ is 0 to 0.0133.

8. The film-forming coating solution as claimed in claim 5, wherein the surface of the particulate compound oxide is reacted with an organosilicon compound or an amine compound.

9. The film-forming coating solution as claimed in claim 1, wherein the particulate compound oxide is a colloidal particulate compound oxide and said film-forming coating solution is prepared by mixing the matrix with the colloidal particulate compound oxide prepared by a process comprising the steps of:
   (a) adding hydrogen peroxide to a gel or a sol of hydrated titanic acid to dissolve the hydrated titanic acid, and heating the resulting titanic acid aqueous solution, in the presence of a silicon compound or in the presence of a silicon compound and a zirconium compound to yield a sol which is a colloidal dispersion of a particulate compound oxide comprising titanium oxide and silicon oxide or titanium oxide, silicon oxide and zirconium oxide; and
   (b) mixing the sol with at least one compound selected from the group consisting of a silicon compound, a zirconium compound and an aluminum compound, followed by heating the resulting mixture with keeping the mixture alkaline; and wherein said film-forming coating solution is cured as a film on a resin lens substrate having a refractive index of not less than 1.54.

10. A synthetic resin lens comprising a resin lens substrate having a refractive index of not less than 1.54 and a cured film provided on the substrate, said cured film being formed from the coating solution as claimed in claim 2.

11. A synthetic resin lens as claimed in claim 10 further having an anti-reflection film of an inorganic material laminated on the cured film.

12. A synthetic resin lens as claimed in claim 10, wherein the lens substrate is formed from a sulfur-containing urethane resin obtained by the reaction of one or more mercapto compounds represented by formulae (I), (II) or their admixture:

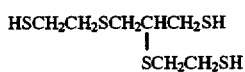

(I)

(II)

with one or more polyisocyanates.

13. A synthetic resin lens as claimed in claim 10, wherein the lens substrate is formed from a copolymer of a monomer represented by formula (III):

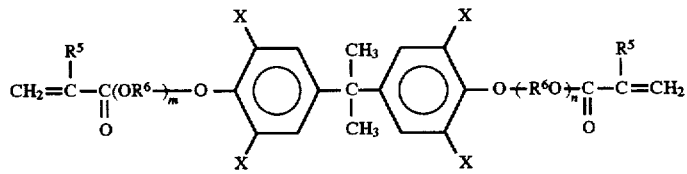

wherein $R^5$ is a hydrogen atom or a methyl group, $R^6$ is $CH_2CH_2$ or $CH_2CH(OH)CH_2$, X is hydrogen atom or halogen atom other than fluorine, and m and n are each an integer satisfying the condition of $0 \leq m+n \leq 8$, and other polymerizable monomers.

14. A synthetic resin lens as claimed in claim 10, wherein the lens substrate is formed from a copolymer of an acrylic monomer and/or a vinyl monomer and another polymerizable monomer, said acrylic monomer and/or vinyl monomer having a sulfur atom and an aromatic ring.

15. The film-forming coating solution as claimed in claim 1, wherein said coating solution is cured as a film on a resin lens substrate of a synthetic resin lens wherein the lens substrate has a refractive index of not less than 1.54.

16. The film-forming coating solution as claimed in claim 15, wherein the synthetic resin lens has an anti-reflection film of an inorganic material laminated on the cured film.

17. The film-forming coating solution as claimed in claim 15, wherein the lens substrate is formed from a sulfur-containing urethane resin obtained by the reaction of one or more mercapto compounds represented by formulae (I), (II) or their admixture:

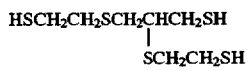

(I)

(II)

with one or more polyisocyanates.

18. The film-forming coating solution as claimed in claim 15, wherein the lens substrate is formed from a copolymer of a monomer represented by formula (III):

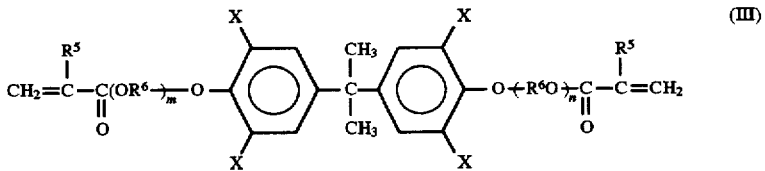

wherein $R^5$ is a hydrogen atom or a methyl group, $R^6$ is $CH_2CH_2$ or $CH_2CH(OH)CH_2$, X is hydrogen atom or halogen atom other than fluorine, and m and n are each an integer satisfying the condition of $0 \leq m+n \leq 8$, and other polymerizable monomers.

19. The film-forming coating solution as claimed in claim 15, wherein the lens substrate is formed from a copolymer of an acrylic monomer and/or a vinyl monomer and another polymerizable monomer, said acrylic monomer and/or vinyl monomer having a sulfur atom and an aromatic ring.

* * * * *

UNITED STATES PATENT AND TRADEMARK OFFICE
CERTIFICATE OF CORRECTION

PATENT NO.   : 5,789,476
DATED        : August 4, 1998
INVENTOR(S)  : Takeaki IRYO et al.

It is certified that error appears in the above-identified patent and that said Letters Patent is hereby corrected as shown below:

Column 9 Line 13 "CeO2" should read --$CeO_2$--.

Column 15 Line 30 "propane -and" should read --propane and--.

Column 18 Line 20 "120'C" should read --120°C--.

Column 21 Line 43 "y-" should read "$\gamma$-".

Column 28 Line 11 "in terms of ZrO2" should read --in terms of $ZrO_2$--.

Column 31 Line 62 "(B'$^1$)" should read --(B'$_1$)--.

Column 32 Line 14 after "(sol D)" insert period --.--.

Claim 2 Column 37 Line 53 "from the roup" should read --from the group--.

Signed and Sealed this

Fifth Day of January, 1999

Attest:

Attesting Officer

*Acting Commissioner of Patents and Trademarks*